United States Patent
Takahashi

(10) Patent No.: US 8,793,369 B2
(45) Date of Patent: Jul. 29, 2014

(54) MANAGEMENT SYSTEM, IMAGE FORMING APPARATUS, AND METHOD THEREFOR

(75) Inventor: Yumiko Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 331 days.

(21) Appl. No.: 12/908,598

(22) Filed: Oct. 20, 2010

(65) Prior Publication Data

US 2011/0099272 A1 Apr. 28, 2011

(30) Foreign Application Priority Data

Oct. 26, 2009 (JP) ................................ 2009-245811

(51) Int. Cl.
*G06F 15/173* (2006.01)
*G06F 3/12* (2006.01)

(52) U.S. Cl.
USPC .......................................... 709/224; 358/1.15

(58) Field of Classification Search
CPC .............................. G06F 3/1229; G06F 3/1234
USPC ........ 709/208–211, 224–227; 358/1.14–1.15; 714/100
See application file for complete search history.

(56) References Cited

U.S. PATENT DOCUMENTS

| | | | |
|---|---|---|---|
| 7,239,409 B2* | 7/2007 | Parry | 358/1.15 |
| 7,679,764 B2* | 3/2010 | Shima | 358/1.15 |
| 7,773,248 B2* | 8/2010 | Kadota | 358/1.16 |
| 2004/0012808 A1* | 1/2004 | Payne et al. | 358/1.15 |
| 2005/0154562 A1* | 7/2005 | Matsuura et al. | 702/185 |
| 2006/0031711 A1* | 2/2006 | Yokokura | 714/5 |

FOREIGN PATENT DOCUMENTS

| | | |
|---|---|---|
| JP | 11-119962 A | 4/1999 |
| JP | 2006-311418 A | 11/2006 |

* cited by examiner

*Primary Examiner* — Chirag R Patel

(74) *Attorney, Agent, or Firm* — Canon USA, Inc., IP Division

(57) ABSTRACT

A management system includes an image forming apparatus that manages a phenomenon having occurred in the image forming apparatus as history information, inquires a management apparatus about status information indicating whether the management apparatus is ready for a remote operation of the image forming apparatus, receives the status information relating to the image forming apparatus, from the management apparatus, as a response to an inquiry, enables a function for starting connection to the management apparatus for communication if the managed history information includes an unprocessed phenomenon and the status information transmitted from the management apparatus indicates that the management apparatus is ready for the remote operation, and causes the image forming apparatus to start the connection to the management apparatus for communication in response to a user's operation to execute the enabled function.

15 Claims, 26 Drawing Sheets

FIG. 4A

ERROR INFORMATION TO BE TRANSMITTED
TO MANAGEMENT APPARATUS 105

| ERROR TRANSMISSION INFORMATION | | ~501 |
|---|---|---|
| ITEM | CONTENT | |
| IMAGE FORMING APPARATUS ID | DEV000001 | ~502 |
| TRANSMISSION DATA TYPE | ERROR | ~503 |
| OCCURRENCE DATE AND TIME | 2009/04/01 09:45 | ~504 |
| TOTAL COUNTER | 12345678 | ~505 |
| CODE | E062-0001 | ~506 |

FIG. 4B

CONNECTION START INFORMATION TO BE TRANSMITTED
TO MANAGEMENT APPARATUS 105

| CONNECTION START INFORMATION | | ~507 |
|---|---|---|
| ITEM | CONTENT | |
| IMAGE FORMING APPARATUS ID | DEV000001 | ~508 |
| TRANSMISSION DATA TYPE | CONNECTION START | ~509 |
| OPERATION DATE AND TIME | 2009/04/01 12:06 | ~510 |

FIG. 5

ERROR HISTORY INFORMATION RETAINED BY IMAGE FORMING APPARATUS 101 ABOUT ERROR HISTORY THEREOF    601

| ERROR HISTORY | | | | |
|---|---|---|---|---|
| ERROR OCCURRENCE DATE AND TIME | ERROR RECOVERY DATE AND TIME | TOTAL COUNTER | ERROR CODE | DETAILED CONTENT |
| 2009/04/01 09:45 | --- | 12345678 | E200-0001 | DEVELOPMENT DEVICE TONER REPLENISHMENT SHORTAGE ERROR |
| 2009/03/20 15:30 | 2009/03/20 15:30 | 12345000 | E100-0001 | DRUM WINDING JAM |
| 2009/03/15 10:15 | 2009/03/15 10:15 | 12344500 | E120-0001 | DETECTION ERROR OF SENSOR AAA |
| ... | ... | ... | ... | ... |

602   603   604   605   606

MANAGEMENT APPARATUS STATUS INFORMATION INQUIRY INFORMATION 701

| MANAGEMENT APPARATUS STATUS INFORMATION INQUIRY DESTINATION |
|---|
| http://xxxxxx/index.html?check=status&devNo=DEV000001 |

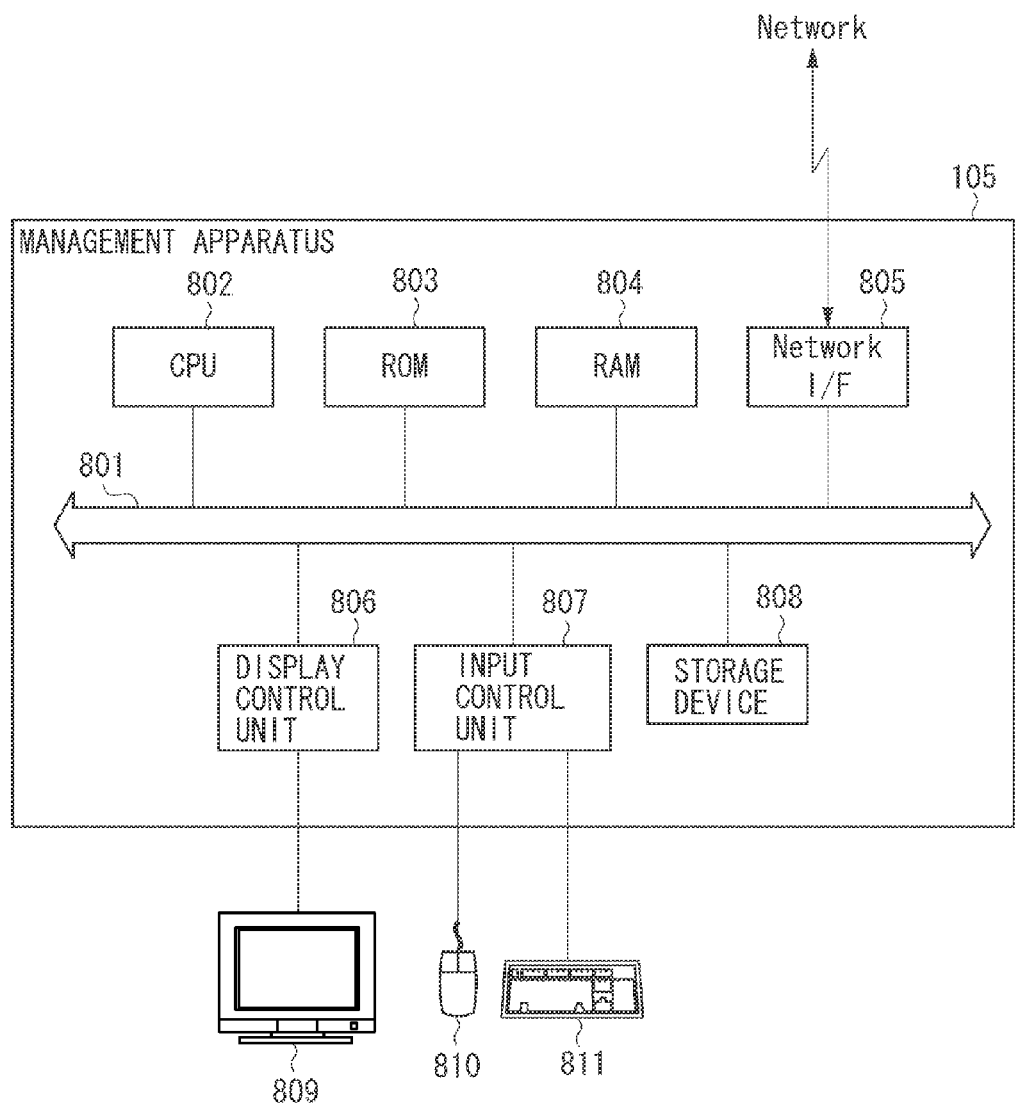

FIG. 9

ERROR HISTORY OF IMAGE FORMING APPARATUS 101  1101
(ID: DEV000001)

| ERROR HISTORY |||
| --- | --- | --- |
| ERROR OCCURRENCE DATE AND TIME | TOTAL COUNTER | ERROR CODE |
| 2009/03/20 15:30 | 12345000 | E100-0001 |
| 2009/03/15 10:15 | 12344500 | E120-0001 |
| 2009/03/09 18:05 | 12344300 | E100-0001 |
| 2009/03/09 08:32 | 12344100 | E100-0001 |
| 2009/03/08 21:59 | 12344090 | E100-0001 |
| ... | ... | ... |

STATUS INFORMATION ABOUT EACH IMAGE FORMING APPARATUS 1201

| STATUS INFORMATION LIST | | |
|---|---|---|
| IMAGE FORMING APPARATUS ID | STANDBY FLAG | SETTING DATE AND TIME |
| DEV000001 | ON | 2009/04/01 11:40 |
| DEV000002 | ON | 2009/03/20 16:30 |
| DEV000003 | ON | 2009/03/16/ 08:00 |
| ... | ... | ... |

STATUS INFORMATION TO BE TRANSMITTED
TO IMAGE FORMING APPARATUS 101

| STATUS INFORMATION | | ~1301 |
|---|---|---|
| STANDBY FLAG | ON | ~1302 |
| SETTING DATE AND TIME | 2009/04/01 11:40 | ~1303 |

FIG. 11B

SETTING CHANGE INFORMATION TO BE TRANSMITTED
TO IMAGE FORMING APPARATUS 101

| SETTING CHANGE INFORMATION | |
|---|---|
| ITEM | E200 OCCURRENCE REFERENCE VALUE |
| VALUE AFTER CHANGE | -2 |
| TRANSMISSION DATE AND TIME | 2009/04/01 11:56 |

1304
1305
1306
1307

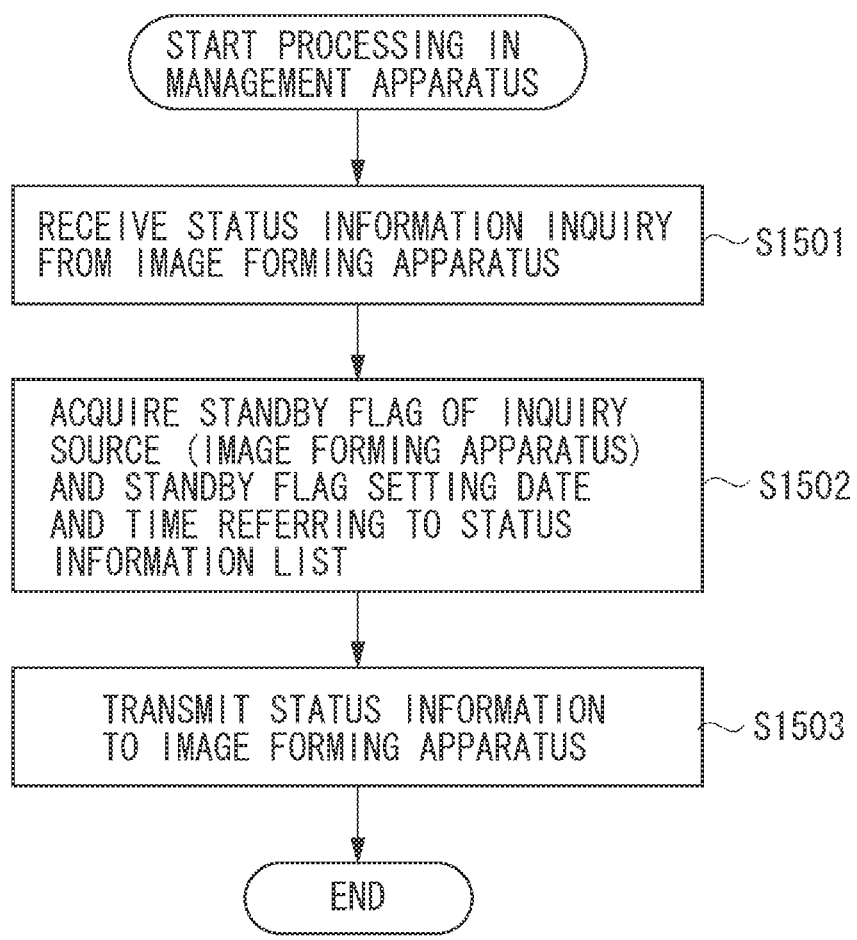

FIG. 14B

CONNECTION PERMISSION BUTTON DISPLAY SCREEN — 1605

PERMIT CONNECTION TO MANAGEMENT APPARATUS

CONNECTION PERMISSION BUTTON DISPLAY SCREEN — 1605

PERMIT CONNECTION TO MANAGEMENT APPARATUS

[ OK ] — 1607

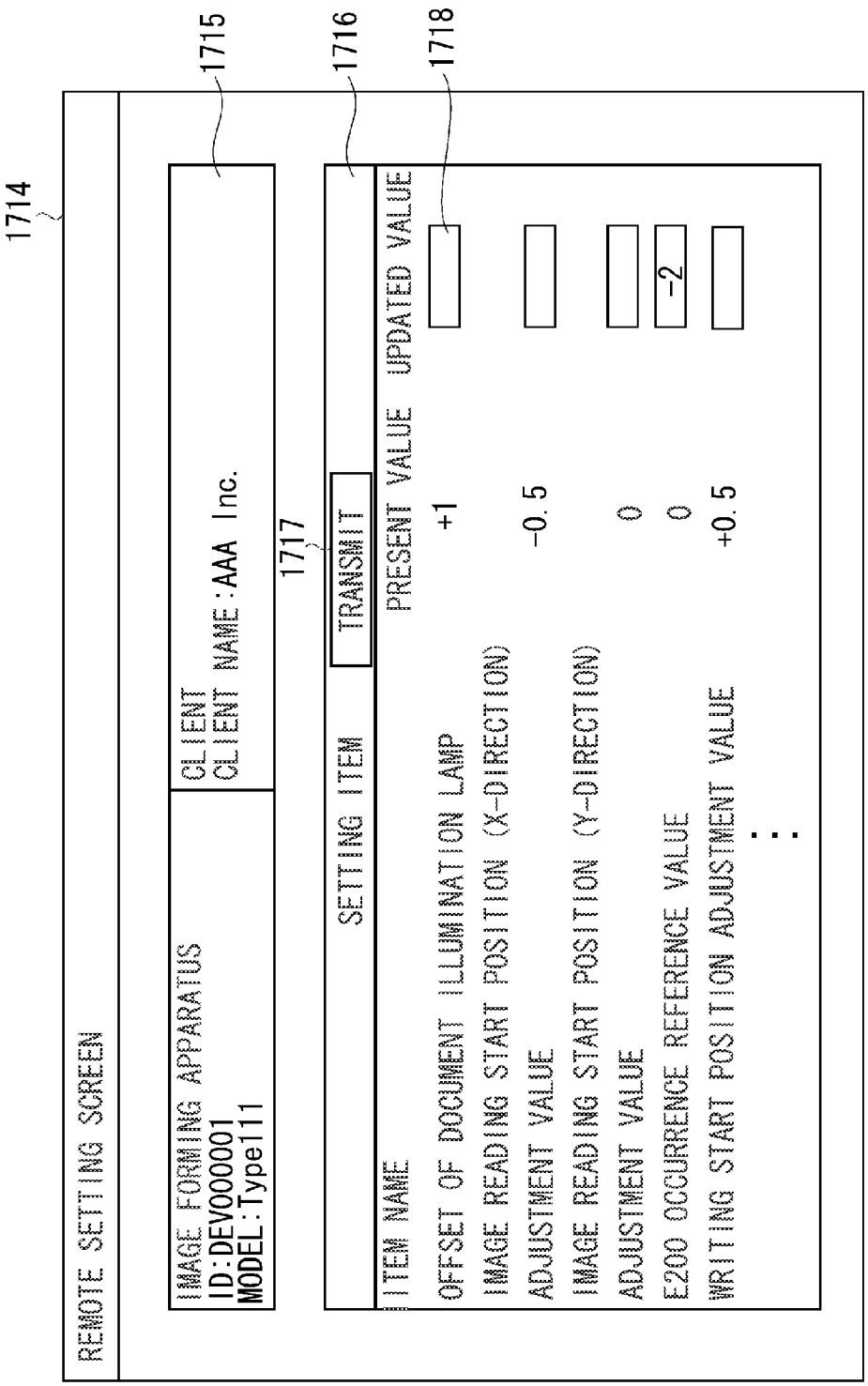

FIG. 16

DETERMINATION TARGET ERROR CODE LIST

| ERROR CODE LIST | | |
|---|---|---|
| CODE | DETAILS | |
| E100-0000 | PAPER SKEW JAM | |
| E100-0001 | DRUM WINDING JAM | |
| E100-0002 | PAPER DELAY JAM | |
| E100-0003 | CASSETTE 1 PAPER DELAY JAM | |
| E100-0004 | CASSETTE 2 PAPER DELAY JAM | |
| . . . | . . . | |

1801 (ERROR CODE LIST row)
1802 (CODE/DETAILS row)

FIG. 18

ERROR CODE MONITORING INFORMATION

ERROR CODE MONITORING INFORMATION
MONITORING TERM 5 DAYS

| CODE | DETAILS | MONITORING STATE | MONITORING START DATA/TIME |
|---|---|---|---|
| E100-0000 | PAPER SKEW JAM | OFF | — |
| E100-0001 | DRUM WINDING JAM | OFF | — |
| E100-0002 | PAPER DELAY JAM | OFF | — |
| E100-0003 | CASSETTE 1 PAPER DELAY JAM | OFF | — |
| E100-0004 | CASSETTE 2 PAPER DELAY JAM | OFF | — |
| E200-0001 | DEVELOPMENT DEVICE TONER REPLENISHMENT SHORTAGE ERROR | ON | 2009/04/01 11:56 |
| ... | ... | ... | ... |

~2001 ~2002 ~2003

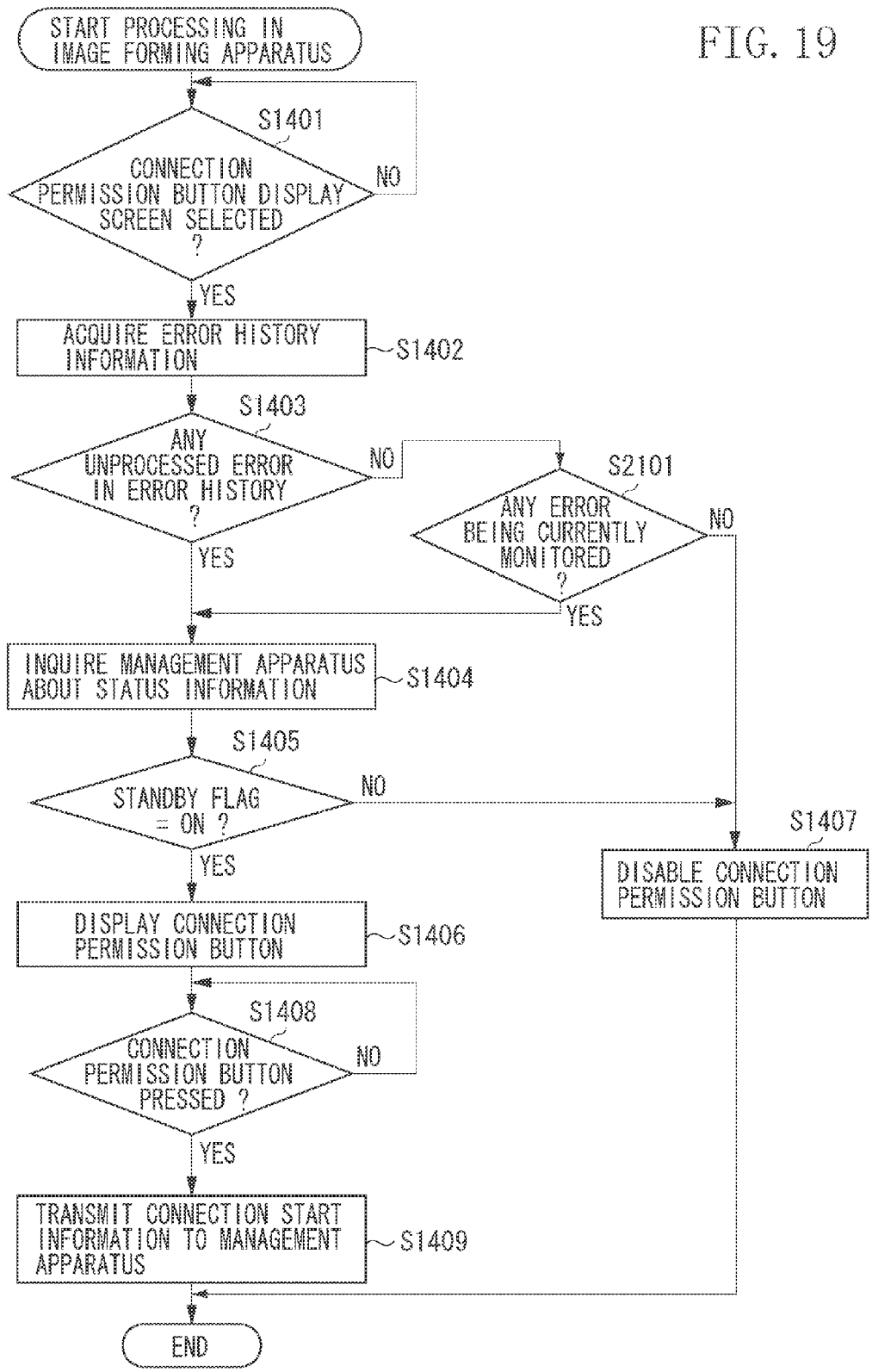

MANAGEMENT SYSTEM, IMAGE FORMING APPARATUS, AND METHOD THEREFOR

BACKGROUND OF THE INVENTION

1. Field of the Invention

The present invention relates to a management system that can manage and maintain an image forming apparatus via a network. More specifically, the present invention relates to a remote operation method for an image forming apparatus configured to be operable, in case of trouble or any other phenomenon occurring in the image forming apparatus, by a management apparatus located at a remote place.

2. Description of the Related Art

There is a conventional system capable of managing an operational status of an image forming apparatus (e.g., a printer, a copying machine, or a multifunction peripheral). The conventional management system can manage operational status information collected from the image forming apparatus and can provide various services to the image forming apparatus according to an operational status.

The services provided by the conventional management system include a service performed by a dispatcher that determines whether the dispatch of a service engineer is necessary in response to an error notification received from the image forming apparatus and sends a service engineer if necessary.

Further, a conventional technique discussed in Japanese Patent Application Laid-Open No. 11-119962 can determine whether a trouble has occurred during an operation in an image forming apparatus and displays a trouble notification screen in case of occurrence of a trouble. The trouble notification screen includes a troubleshooting (trouble countermeasure) button. If the troubleshooting button is operated by a user, an appropriate troubleshooting method can be displayed.

The phenomenon, such as a trouble having occurred in the image forming apparatus, for which a user is required to perform a countermeasure operation at a setup place of the image forming apparatus discussed in Japanese Patent Application Laid-Open No. 11-119962 includes a phenomenon (e.g., blur), the degree of which can be improved by changing device setting information (e.g., tint adjustment, density adjustment, and writing start position). In this case, it is desired that a management apparatus located at a remote place can perform a remote operation without sending a service engineer to work at the setup place of the image forming apparatus.

However, to perform a remote operation, it is necessary to establish a communication line between the image forming apparatus and the management apparatus. However, due to the presence of security barriers (e.g., requirement of client authorization, setting of firewall, etc.), it is generally difficult for the management apparatus to smoothly start the communication. Therefore, it is desired to provide a useful function (e.g., a connection permission button) to acquire user's permission with respect to a remote operation of the image forming apparatus to be performed by the management apparatus and cause the image forming apparatus to start the communication.

In this case, each time the connection permission button is operated by a user, the image forming apparatus is forced to communicate with the management apparatus. Therefore, if the connection permission button is unconditionally operated by a user, the processing (communication) load of the management apparatus increases greatly. Further, if the connection permission button is operated, the image forming apparatus is brought into a state vulnerable in security because of the communication with the image forming apparatus.

Therefore, it is desired that the connection permission button is operable only when the communication is really necessary, instead of unconditionally permitting users to operate the connection permission button, even in a case where a phenomenon having occurred in the image forming apparatus is processable in a remote operation.

SUMMARY OF THE INVENTION

The present invention is directed to a technique capable of enabling a user (e.g., a client user) of an image forming apparatus to use a function for permitting connection between the image forming apparatus and a management apparatus only when a remote operation is feasible and necessary.

Further, in the above-described situation, the management apparatus provides an operation screen usable for determination processing and operable by an operator to operate the function for permitting the connection between the image forming apparatus and the management apparatus.

According to an aspect of the present invention, a management system includes an image forming apparatus and a management apparatus that can communicate with each other via a network. The management apparatus includes a storage unit configured to store status information indicating whether the management apparatus is ready for a remote operation and a response unit configured to transmit the status information stored in the storage unit to the image forming apparatus in response to an inquiry received from the image forming apparatus. The image forming apparatus includes a management unit configured to manage a phenomenon having occurred in the image forming apparatus as history information, an inquiry unit configured to inquire the management apparatus about the status information, and a reception unit configured to receive the status information relating to the image forming apparatus, from the management apparatus, as a response to an inquiry from the inquiry unit. The image forming apparatus further includes a control unit configured to enable a function for starting connection to the management apparatus for communication and a connection start unit configured to cause the image forming apparatus to start the connection to the management apparatus for communication in response to a user's operation to execute the function for starting the connection to the management apparatus enabled by the control unit. The control unit enables the function for starting the connection to the management apparatus if the history information managed by the management unit includes an unprocessed phenomenon and the status information transmitted from the management apparatus to the reception unit indicates that the management apparatus is ready for the remote operation. The remote operation by the management apparatus can be realized by causing the image forming apparatus to execute a command transmitted from the management apparatus in the communication established and started by the connection start unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A and 4B illustrate example error information to be transmitted to the management apparatus.

FIG. 5 illustrates an example error history retained by the image forming apparatus.

FIG. 7 illustrates an example hardware configuration of the management apparatus according to an exemplary embodiment of the present invention.

FIG. 9 illustrates example error history information relating to the image forming apparatus managed by the management apparatus.

FIG. 10 illustrates an example list of status information managed by the management apparatus.

FIGS. 11A and 11B illustrate example information transmitted from the management apparatus to the image forming apparatus.

FIG. 13 is a flowchart illustrating an example operation of the management apparatus according to the first exemplary embodiment of the present invention.

FIGS. 14A to 14C illustrate example display screens provided by the image forming apparatus according to the first exemplary embodiment of the present invention.

FIGS. 15A to 15C illustrate example display screens provided by the management apparatus according to the first exemplary embodiment of the present invention.

FIG. 16 illustrates an example of a management apparatus determination target error code list according to a second exemplary embodiment of the present invention.

FIG. 18 illustrate an example of error code monitoring information retained by the image forming apparatus according to a third exemplary embodiment of the present invention.

FIG. 19 is a flowchart illustrating an operation of the image forming apparatus according to the third exemplary embodiment of the present invention.

DESCRIPTION OF THE EMBODIMENTS

Various exemplary embodiments, features, and aspects of the invention will be described in detail below with reference to the drawings.

Figure 1:
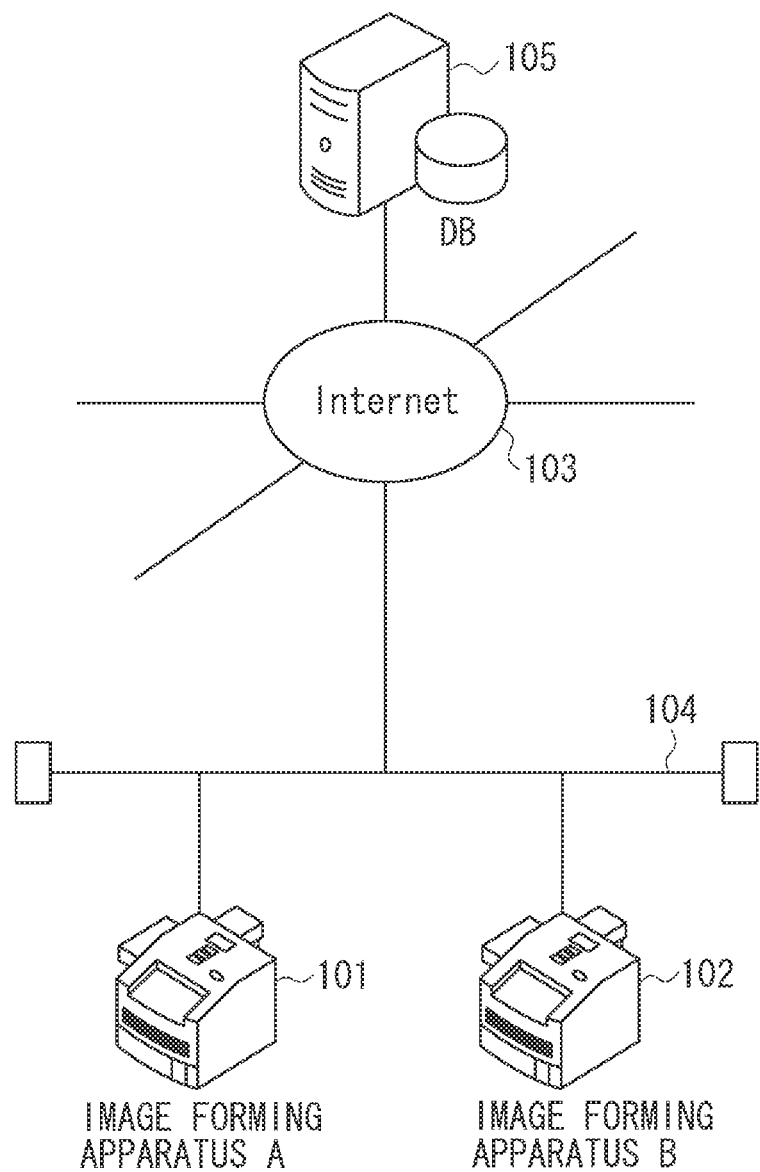
FIG. 1 illustrates a connecting relationship between an image forming apparatus and a management apparatus connected via the Internet according to an exemplary embodiment of the present invention.

An example system illustrated in FIG. 1 includes two image forming apparatuses 101 and 102, which are respectively connected to a client network 104. The image forming apparatus is, for example, a multifunction peripheral (MFP) that is functionally operable as a printer, a scanner, a copying machine, and a facsimile machine. The image forming apparatus can be a single-function peripheral (SFP) that is functionally operable as a printer. The example system illustrated in FIG. 1 further includes a management apparatus 105 that can manage each of the image forming apparatuses 101 and 102.

The management apparatus 105 can transmit and receive, via the Internet 103, data and information to and from the image forming apparatuses 101 and 102 connected to the network 104 and other image forming apparatuses (not illustrated). The management apparatus 105 manages information received from each image forming apparatus.

The image forming apparatuses 101 and 102 are connected to the same network (local area network (LAN)) 104. The image forming apparatuses 101 and 102 can be connected to another network (e.g., an external LAN) that is accessible via the Internet 103.

Figure 2:
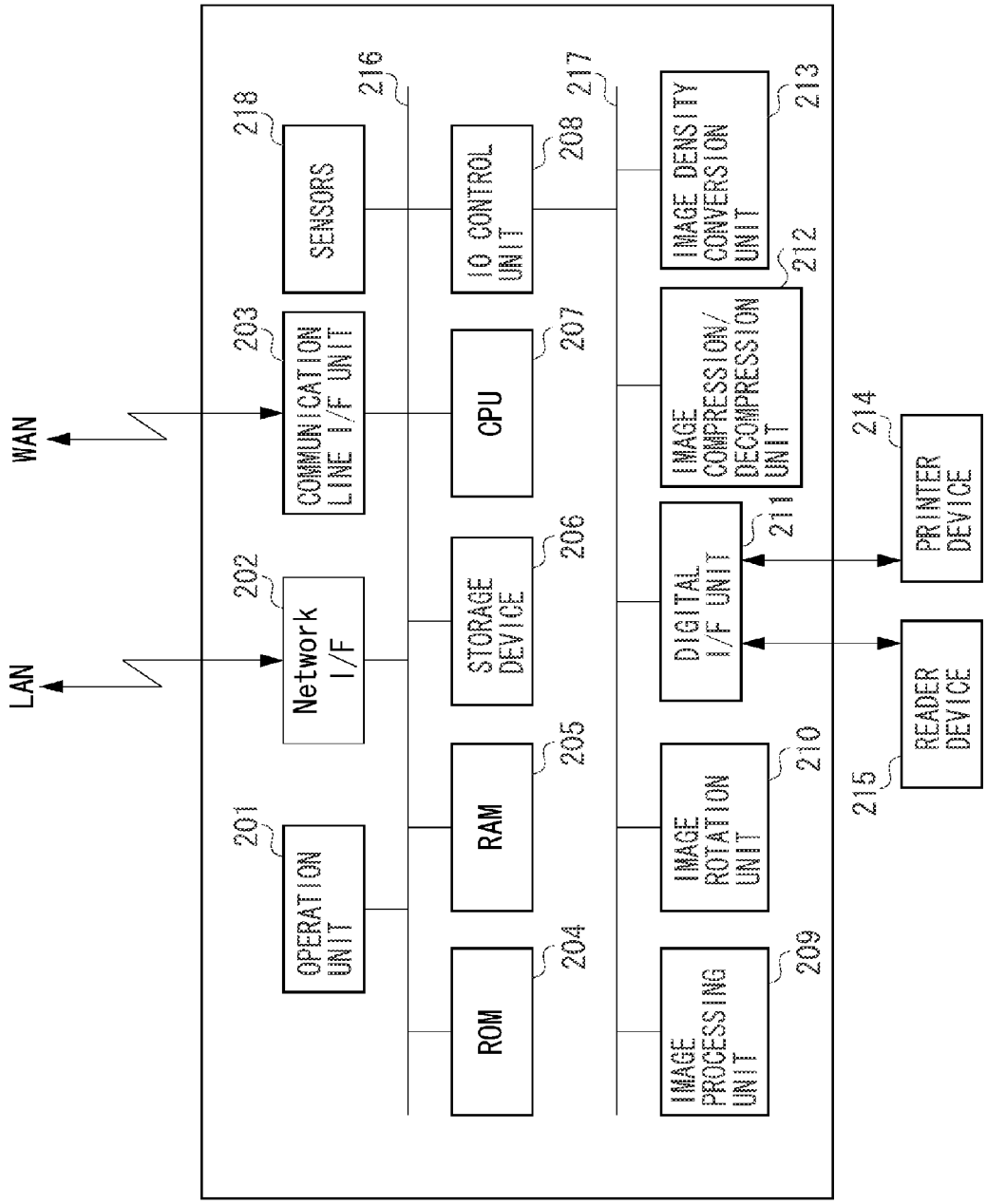
FIG. 2 illustrates an example hardware configuration of the image forming apparatus according to an exemplary embodiment of the present invention.

FIG. 2 is a block diagram illustrating an example hardware configuration of the image forming apparatus 101 according to an exemplary embodiment of the present invention.

Constituent components of the image forming apparatus 101 are connected to a system bus 216 or an image bus 217. A read only memory (ROM) 204 stores an image forming apparatus control program, a monitoring program, and a display control program, which can be executed by a central processing unit (CPU) 207. In the present exemplary embodiment, the monitoring program is incorporated in the image forming apparatus 101. However, it is needless to say that the monitoring program can be incorporated in an independent monitoring apparatus, which is configured to acquire information from the image forming apparatus 101 via a network.

A random access memory (RAM) 205 is a work memory area for the CPU 207 that executes computer programs. The RAM 205 can be an image memory that temporarily stores image forming apparatus status information and image data that are required for the management by an image forming apparatus management program. A storage device 206 is a nonvolatile storage medium capable of storing an image forming apparatus identifier (hereinafter, referred to as "image forming apparatus ID") and an operation log that are required to be retained even after the image forming apparatus 101 is rebooted.

A network interface (I/F) 202 is an interface unit that can connect the image forming apparatus 101 to the LAN 103 so that the image forming apparatus 101 can communicate with the management apparatus 105 via the LAN 103. A communication line I/F unit 203 is connected to the Integrated Services Digital Network (ISDN) or a public telephone network and can be controlled by a communication control program stored in the ROM 204 so that the image forming apparatus 101 can transmit and receive data to and from a remote terminal via an ISDN I/F or a modem or a network control unit (NCU).

The communication line I/F unit 203 can be used for facsimile transmission/reception. An operation unit 201 includes a display unit and a key input unit, which are incorporated in the operation unit body and can be controlled by the CPU 207. The key input unit enables users to input various setting instructions relating to scanner reading and print output as well as operation/stop instructions. The above-described constituent components of the image forming apparatus 101 are connected to the system bus 216.

An input/output (IO) control unit 208 is a bus bridge provided between the system bus 216 and the image bus 217. The image bus 217 can speedily transfer image data. The image bus 217 can be constituted by a Peripheral Component Interface (PCI) bus or IEEE1394. The following constituent components of the image forming apparatus 101 are connected to the image bus 217. A digital I/F unit 211 connects a reader device 215 and a printer device 214 associated with the image forming apparatus 101 to the IO control unit 208. The digital I/F unit 211 can perform synchronous/asynchronous conversion on image data.

Further, sensing information detected by various sensors provided in the reader device 215 and the printer device 214 are sent to the system bus 216 via the digital I/F unit 211 and the IO control unit 208. An image processing unit 209 can perform correction/modification/editing processing on input and output image data. An image rotation unit 210 can rotate image data. An image compression/decompression unit 212 can perform JPEG compression/decompression processing on multi-valued image data and perform JBIG/MMR/MR/MH compression/decompression processing on binary image data. An image density conversion unit 213 can perform resolution conversion on image data to be output.

The CPU 207 executes the monitoring program to read operational information (e.g., counter value and operation log) and failure information from the storage device 206, and transmits the read information as image forming apparatus status information to the management apparatus 105 via the network I/F 202.

Further, sensors 218 provided at appropriate portions in the image forming apparatus 101 can measure, for example, apparatus temperature, apparatus humidity, drum surface temperature, and drum surface potential. The measurement values obtained by the sensors 218 are recorded in the storage device 206. The measurement values recorded in the storage device 206 can be displayed on the operation unit 201 when the image forming apparatus 101 is operating in a maintenance mode. Further, the operation unit 201 enables users to change various setting values (e.g., tint adjustment, density adjustment, writing start position, and toner replenishment amount) relating to an image forming operation.

Figure 3A:
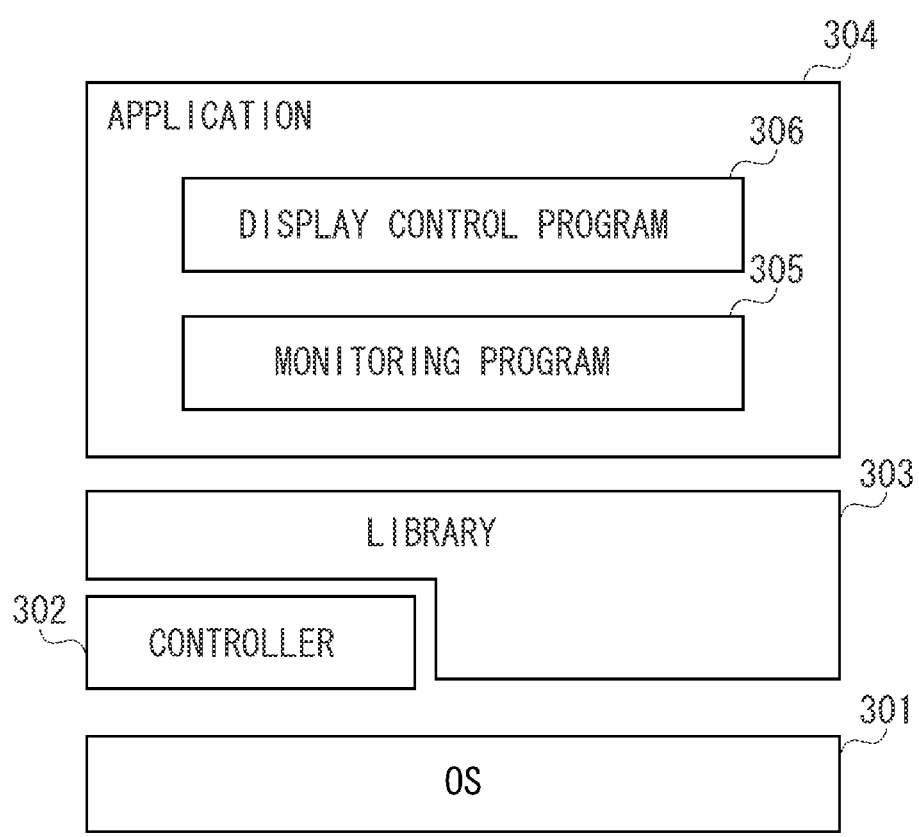
FIGS. 3A and 3B illustrate example functional configurations of the image forming apparatus according to an exemplary embodiment of the present invention.

FIG. 3A illustrates an example software configuration of the image forming apparatus 101 according to the present exemplary embodiment. The software configuration illustrated in FIG. 3A includes only the software programs relevant to the present exemplary embodiment. Namely, FIG. 3A does not illustrate other programs that are not related to the operations according to the present exemplary embodiment. To activate the system, the CPU 207 reads a system boot program (not illustrated) from the ROM 204 and starts an operation according to the boot program. Further, the CPU 207 executes each program loaded from the storage device 206 to the RAM 205.

The software configuration illustrated in FIG. 3A includes an operating system (OS) 301, a controller 302, a library 303, and an application 304. The controller 302 controls an image forming operation to be performed by the image forming apparatus 101. The controller 302 detects an abnormality if occurred during the operation of the image forming apparatus 101. The controller 302 stores abnormality information relating to the detected abnormality in the storage device 206. Further, the library 303 can be used when the application 304 refers to the information stored in the storage device 206 by the controller 302, or can be used when an operation instruction of the image forming apparatus 101 is output to the controller 302.

The application 304 includes a monitoring program 305 and a display control program 306.

The monitoring program 305 acquires various information relating to the image forming apparatus via the controller 302 and performs processing for controlling a monitoring operation. The monitoring program 305 periodically acquires information relating to firmware type, number of printed sheets, and consumed state of running stores, and transmits the acquired information to the management apparatus 105.

Further, the monitoring program 305 detects generation of status information (e.g., error, alarm, jam, toner change timing, and door open) and transmits the generated status information to the management apparatus 105. In addition, if occurrence of an error is detected, the monitoring program 305 determines and executes acquisition/transmission of a measurement value.

If a service engineer operates the operation unit 201 to change a setting value, the monitoring program 305 acquires the changed setting value and transmits the acquired setting value to the management apparatus 105. It is needless to say that the information periodically generated and transmitted by the monitoring program 305 is not limited to the above-described information.

In addition, the monitoring program 305 starts connection to the management apparatus 105 in response to a user's selection of a connection permission button displayed on the operation unit 201, and accepts a remote operation performed by the management apparatus 105.

If the operation unit 201 accepts a user's operation to select a connection permission button display screen, the display control program 306 determines whether to display the connection permission button and generates the connection permission button display screen based on a determination result, and then displays the generated screen on the operation unit 201.

Figure 3B:
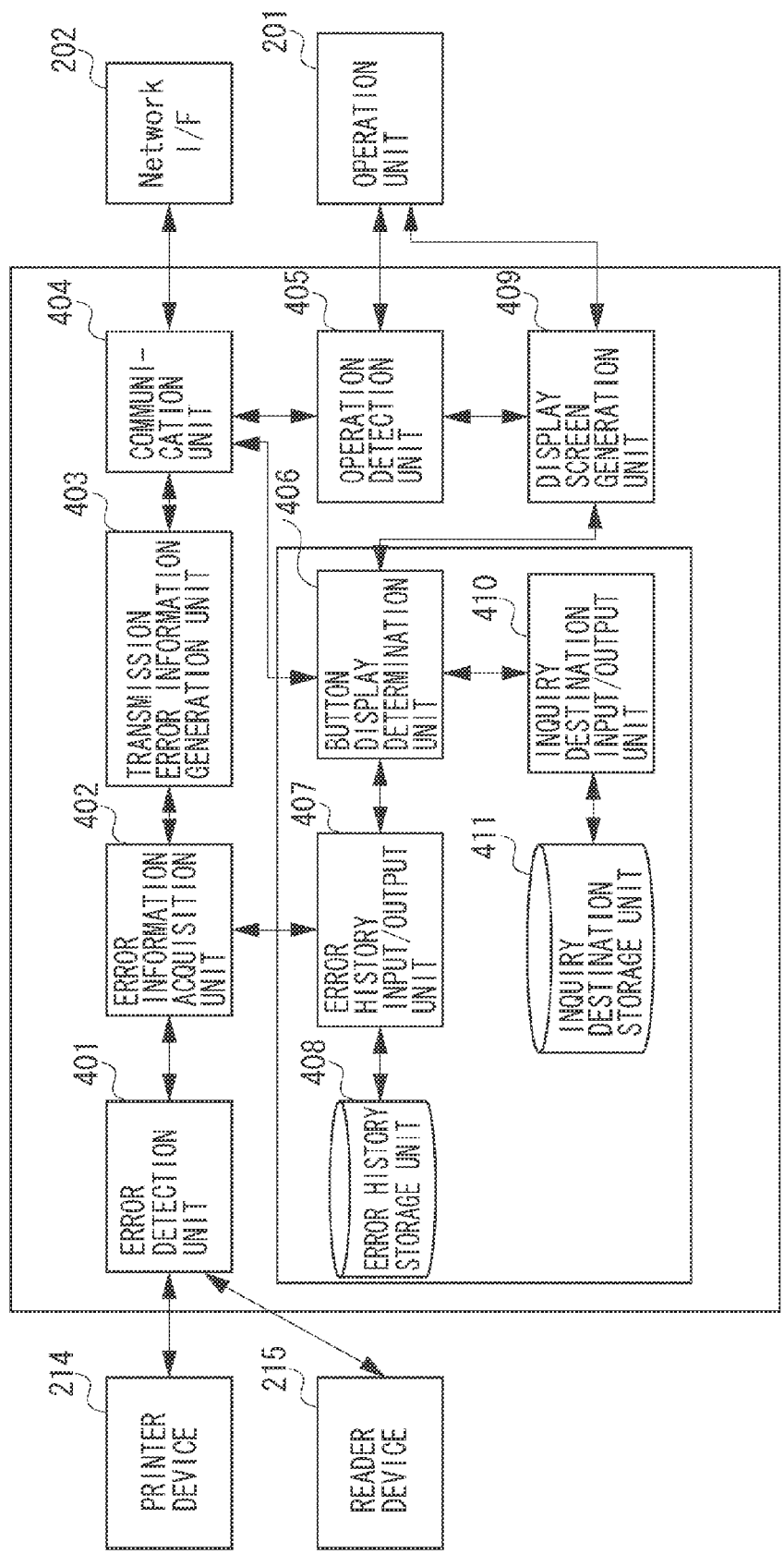

FIG. 3B is a block diagram illustrating a functional configuration of the image forming apparatus 101 according to the present exemplary embodiment.

Regarding an operation relating to the monitoring program 305, an error detection unit 401 detects an error occurrence in the printer device 214 or in the reader device 215. If the error occurrence is detected by the error detection unit 401, an error information acquisition unit 402 acquires error information from the storage device 206. A transmission error information generation unit 403 generates error information to be transmitted to the management apparatus 105 based on the acquired error information and stores the generated error information in the storage device 206.

A communication unit 404 transmits the error information stored in the storage device 206 to the management apparatus 105 via the network I/F 202. Further, in this case, a measurement value input/output unit (not illustrated) acquires a measurement value from the storage device 206 of the image forming apparatus 101. A measurement value transmission information generation unit (not illustrated) generates measurement value information to be transmitted to the management apparatus 105 based on the acquired measurement value and stores the generated measurement value information in the storage device 206.

The measurement value information is transmitted together with the error information to the management apparatus 105 via the network I/F 202. On the other hand, if the operation unit 201 detects a setting change operation performed by a service engineer, the image forming apparatus 101 executes setting value acquisition processing and transmission processing similar to that for the measurement value.

The display control program 306 can be called by the CPU 207 when an operation detection unit 405 detects a user's operation to select the connection permission button display screen performed on the operation unit 201. The display control program 306, if called, causes a display screen generation unit 409 to generate the connection permission button display screen.

To generate the connection permission button display screen, the display screen generation unit 409 refers to a determination result of a button display determination unit 406 that determines whether to display the connection permission button. First, the button display determination unit 406 acquires error history information from an error history storage unit 408 via an error history input/output unit 407.

If an unprocessed error is included in the acquired error history, the button display determination unit 406 determines that it is necessary to inquire the management apparatus 105 about status information. If there is not any unprocessed error in the acquired error history, the button display determination unit 406 determines that it is unnecessary to inquire the management apparatus 105 about status information. In this case, the connection permission button is not displayed. In the present exemplary embodiment, occurrence of an error is regarded as an unprocessed state.

Further, in a case where there is an unprocessed error, the button display determination unit 406 acquires inquiry destination information from an inquiry destination storage unit 411 via an inquiry destination input/output unit 410. The button display determination unit 406 stores the acquired inquiry destination information in the RAM 205.

The communication unit 404 inquires the management apparatus 105 about the status information via the network I/F 202, based on the inquiry destination information stored in the RAM 205. If the communication unit 404 receives an inquiry result from the management apparatus 105 via the network I/F 202, the button display determination unit 406 determines whether to display the connection permission button based on the received inquiry result.

Further, if the operation detection unit 405 detects a user's operation to press the connection permission button displayed on the operation unit 201, the monitoring program 305 transmits connection start information to the management apparatus 105 via the network I/F 202.

FIG. 4A illustrates an example of the error information according to the present exemplary embodiment, which can be generated in response to detection of an error by the transmission error information generation unit 403 and transmitted to the management apparatus 105. In the present exemplary embodiment, the generated information is temporarily stored in the RAM 205.

FIG. 4A illustrates error information 501 to be transmitted to the management apparatus 105. The error information 501 includes image forming apparatus ID 502, transmission data type 503, occurrence date and time 504, total counter 505 (total number of sheets printed by the image forming apparatus 101 at the occurrence date and time 504), and code 506.

Further, FIG. 4B illustrates an example of the connection start information according to the present exemplary embodiment, which can be transmitted by the image forming apparatus 101 to the management apparatus 105, when the operation detection unit 405 detects an operation to press the connection permission button. In the present exemplary embodiment, the generated information is stored in the RAM 205.

FIG. 4B illustrates connection start information 507 to be transmitted to the management apparatus 105. The connection start information 507 includes image forming apparatus ID 508, transmission data type 509, and operation date and time 510 (detection timing of the operation to press the connection permission button).

FIG. 5 illustrates an example of error history information according to the present exemplary embodiment, which the image forming apparatus 101 can store in the storage device 206.

FIG. 5 illustrates error history information 601 retained by the image forming apparatus 101. The error history information 601 includes error occurrence date and time 602, error recovery date and time 603, total counter 604 (at error occurrence timing), error code 605, and detailed content 606 of the error code.

According to the example illustrated in FIG. 5, an error code "E200-0001" having occurred at "2009/04/01 09:45" is the latest error. The content of the error is "development device toner replenishment shortage error." Further, the total counter (at the error occurrence timing) is "12345678." As no information is present in the "error recovery date and time" field, it is understood that the error is not yet recovered and it is concluded that the error code "E200-0001" is an unprocessed error.

Figure 6:
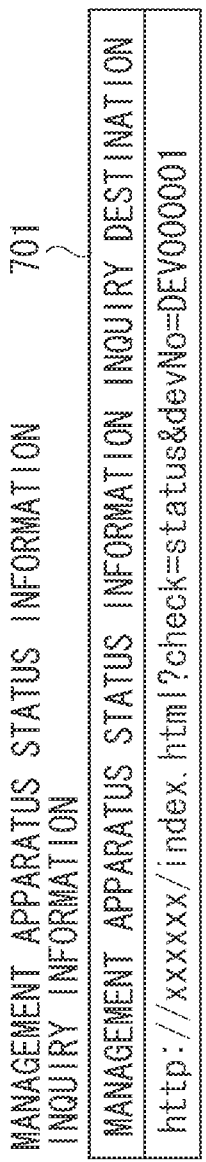
FIG. 6 illustrates standby state inquiry destination information retained by the image forming apparatus.

FIG. 6 illustrates an example of the inquiry destination information according to the present exemplary embodiment, which the image forming apparatus 101 can store in the storage device 206. In the present exemplary embodiment, the inquiry destination information is stored in the storage device 206.

FIG. 6 illustrates an inquiry destination 701 that indicates a destination required to inquire the status information. The display control program 306 inquires about a standby state of the management apparatus 105 based on the inquiry destination information. The inquiry destination information 701 is Uniform Resource Locator (URL), in which "check=status" indicates requiring the status information and "devNo=DEV000001" indicates that the image forming apparatus ID of the image forming apparatus 101 is "DEV000001." In the present exemplary embodiment, the inquiry destination is not limited to URL information and can be any other address information.

FIG. 7 is a block diagram illustrating an example hardware configuration of the management apparatus 105.

The management apparatus 105 can be constituted by a general computer. The management apparatus 105 includes a CPU 802, a ROM 803, and a RAM 804. The CPU 802 can control various operations to be performed by the management apparatus 105. The ROM 803 storage a boot program that is necessary to boot the system. The RAM 804 can serve as a work memory when the CPU 802 executes a program.

Further, the management apparatus 105 includes a network interface (I/F) 805, a display control unit 806, an input control unit 807, and a storage device 808. The network I/F 805 is functionally operable to communicate with an external device via a network. The storage device 808 stores programs to be executed by the CPU 802 and operational information of each image forming apparatus managed by the management apparatus 105.

The above-described functional components are mutually connected via a system bus 801. A display device 809 is connected to the display control unit 806. Further, input devices 810 and 811 are connected to the input control unit 807. An operator who manages the management apparatus 105 can confirm an operational state of the management apparatus 105 via these input/output devices and can instruct an operation to be performed by the management apparatus 105.

Image forming apparatus information managed by the management apparatus 105 includes image forming apparatus ID that can be referred to in identifying each image forming apparatus, fundamental image forming apparatus information (e.g., firmware type of the image forming apparatus and device type of the image forming apparatus), error/alarm/jam information, and consumed state of parts.

The management apparatus 105 manages the image forming apparatus ID of each image forming apparatus in association with various information relating to the image forming apparatus, which are stored in the storage device 808. Further, the management apparatus 105 holds an image forming apparatus identifier management table (not illustrated), which is a list of image forming apparatus identifiers representing the image forming apparatuses managed by the management apparatus 105.

Figure 8A:
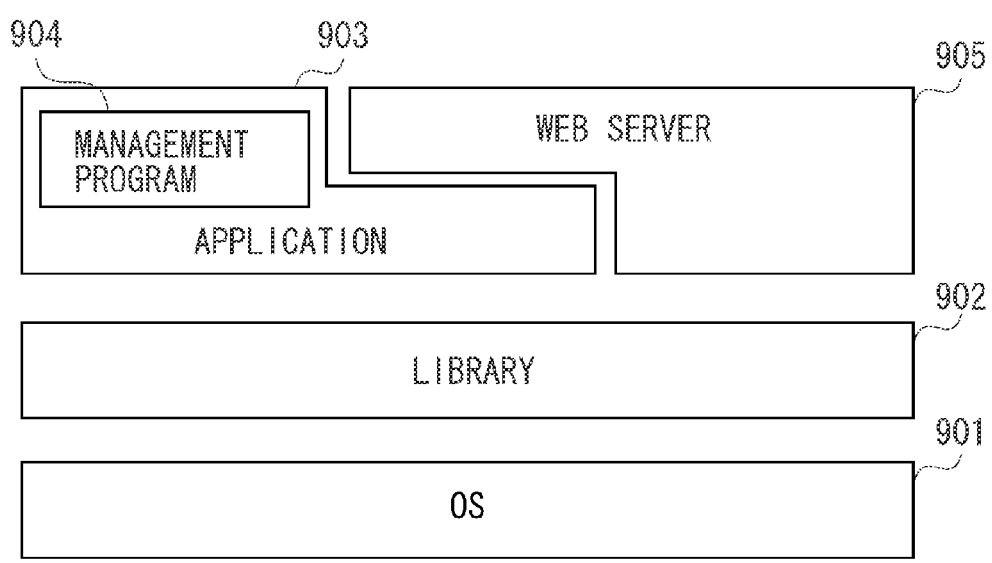
FIGS. 8A and 8B illustrate example functional configurations of the management apparatus according to an exemplary embodiment of the present invention.

FIG. 8A is a block diagram illustrating an example software configuration of the management apparatus 105.

To activate the system, the CPU 802 reads a system boot program (not illustrated) from the ROM 803 and starts an operation according to the boot program. Further, the CPU 802 executes each program loaded from the storage device 808 to the RAM 804. The software configuration illustrated in FIG. 8A includes an operating system (OS) 901, a library 902, an application 903, and a web server 905. The application 903 includes a management program 904 that is required to manage the image forming apparatus 101 accessible via the Internet 104. The web server 905 can transmit and receive messages to and from the image forming apparatus 101 via the Internet 104.

Figure 8B:
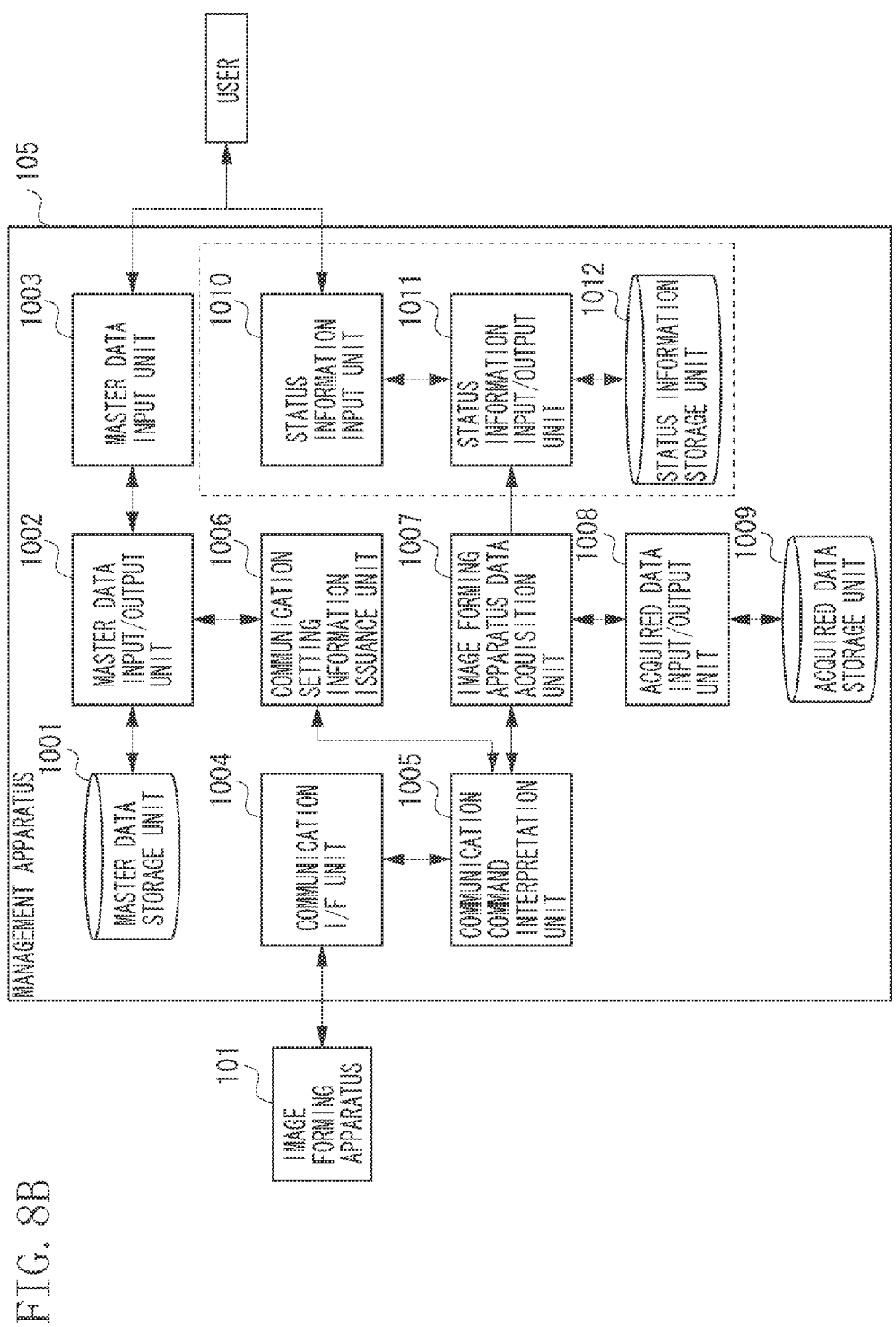

FIG. 8B is a block diagram illustrating a functional configuration of the management apparatus 105 according to the first exemplary embodiment. The functional configuration illustrated in FIG. 8B relates to functions performed by the management program 904.

A master data storage unit 1001 stores master data. The master data is roughly classified into two types of master data. The first type of master data is model-dependent master data representing code information dependent on each model of the image forming apparatus, such as product name, basic model information (e.g., product specifications), error, and alarm of the image forming apparatus 101.

The second type of master data is monitoring target master data representing monitoring target individual information, such as image forming apparatus ID, setup place, and client information (including contract information) of a monitoring target image forming apparatus. The management program 904 includes a master data input/output unit 1002. The master data input/output unit 1002 stores input master data in the master data storage unit 1001.

Further, the management program 904 includes a master data input unit 1003 that can accept master data having been input by an operator (e.g., administrator of the management apparatus 105). The management program 904 requires input of the above-described two types of master data when the management program 904 issues transmission settings.

The management program 904 includes a communication I/F unit 1004 that communicates with the monitoring program 305. Further, the management program 904 includes a communication command interpretation unit 1005 that can extract an identification ID and a communication command from data received from the monitoring program 305 and can convert data, before it is transmitted to the monitoring program 305, into an appropriate communication format.

Further, the management program 904 includes a communication setting information issuance unit 1006 that can determine a transmission setting suitable for the monitoring program 305 when it is required to transmit a new transmission setting to the target monitoring program 305 or if a transmission schedule is requested.

The communication setting information issuance unit 1006 calls model-dependent master information and monitoring target master information from the master data input/output unit 1002, and determines the transmission setting suitable for the monitoring program 305.

Further, the management program 904 includes an image forming apparatus data acquisition unit 1007 that receives, from the communication command interpretation unit 1005, image forming apparatus status information received from the monitoring program 305 in an ordinary monitoring state. The received status information includes measurement values and setting values of the image forming apparatus.

The management program 904 further includes an acquired data storage unit 1009 that stores the status information acquired by the image forming apparatus data acquisition unit 1007. The image forming apparatus status information stored in the acquired data storage unit 1009 can be displayed on the display device 809. In the present exemplary embodiment, processing for inputting and outputting status information to and from the acquired data storage unit 1009 can be performed by an acquired data input/output unit 1008.

On the other hand, the management program 904 detects occurrence of frequent jams and presence of any error being left by causing the image forming apparatus data acquisition unit 1007 to refer to the image forming apparatus status information. Similar to the received image forming apparatus status information, the detected state of the image forming apparatus (e.g., occurrence of frequent jams) is stored in the acquired data storage unit 1009.

By determining any phenomenon that cannot be detected by the image forming apparatus 101, the management program 904 can display, on the display device 809, a notification indicating that an appropriate countermeasure is required for the image forming apparatus 101.

Further, the management program 904 includes a status information input unit 1010 that can accept status information input by an operator or a service engineer. The status information indicates that preparation of a countermeasure operation for the image forming apparatus 101 is accomplished. Further, the management program 904 includes a status information input/output unit 1011. The status information input/output unit 1011 stores input status information in a status information storage unit 1012.

If the management program 904 receives inquiry about status information from the image forming apparatus 101 via the communication I/F unit 1004, the image forming apparatus data acquisition unit 1007 acquires an image forming apparatus ID of an inquiry source. The management program 904 acquires status information corresponding to the image forming apparatus ID via the status information input/output unit 1011 and transmits the acquired status information to the image forming apparatus 101 via the communication I/F unit 1004.

FIG. 9 illustrates example error history information of the image forming apparatus 101 that is managed by the management apparatus 105 according to the first exemplary embodiment. In the present exemplary embodiment, the error history information is stored in the storage device 808.

FIG. 9 illustrates an error history 1101 transmitted from the image forming apparatus 101 to the management apparatus 105, which includes error occurrence date and time 1102, total counter 1103 (at error occurrence timing), and error code 1104.

FIG. 10 illustrates an example of an image forming apparatus status information list managed by the management apparatus 105. In the present exemplary embodiment, the status information list is stored in the storage device 808.

FIG. 10 illustrates a status information list 1201 that stores status information of each image forming apparatus managed by the management apparatus 105. The status information list 1201 includes image forming apparatus ID 1202, standby flag 1203, and setting date and time 1204 of the standby flag.

In the present exemplary embodiment, the standby flag 1203 can be set when an operator or a service engineer operates the input control unit 807 to input status information indicating that preparation of the countermeasure operation for the image forming apparatus 101 is accomplished.

FIG. 11A illustrates an example of information that can be returned to the image forming apparatus 101 from the management apparatus 105 according to the first exemplary embodiment, in response to an inquiry of status information received from the image forming apparatus 101.

The information illustrated in FIG. 11A is status information 1301 to be transmitted to the image forming apparatus 101. The status information 1301 includes standby flag 1302 and setting date and time 1303 of the standby flag 1302.

FIG. 11B illustrates an example of setting change information that can be returned to the image forming apparatus 101 from the management apparatus 105 according to the first exemplary embodiment.

The setting change information illustrated in FIG. 11B is setting change information 1304 to be transmitted to the image forming apparatus 101. The setting change information 1304 includes setting change item 1305, value after change 1306, and transmission date and time 1307 of the setting change information. The setting change information 1304 can be set by an operator or a service engineer who operates the management apparatus 105.

Figure 12:
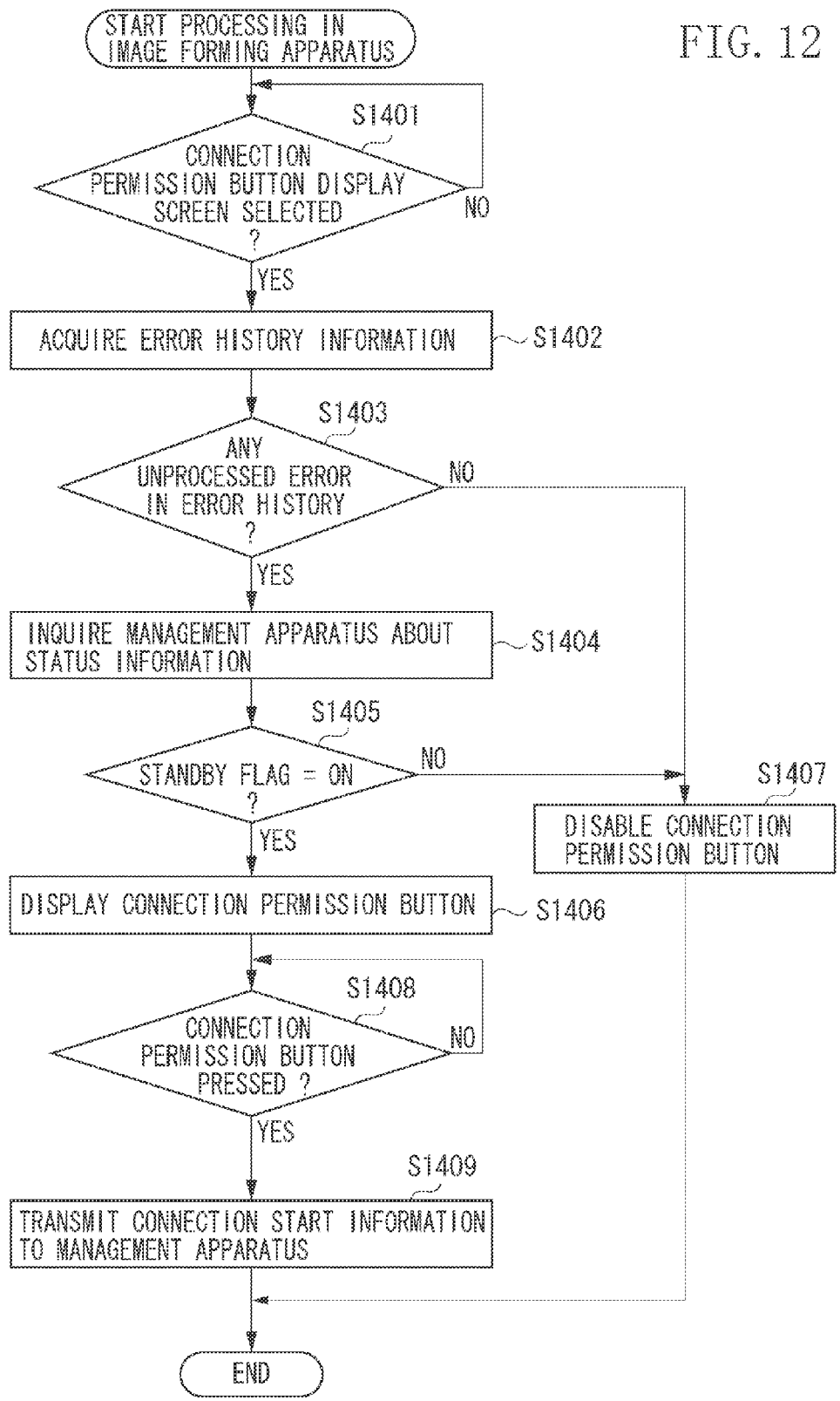
FIG. 12 is a flowchart illustrating an example operation of the image forming apparatus according to a first exemplary embodiment of the present invention.

FIG. 12 is a flowchart illustrating an example operation of the image forming apparatus 101 according to the first exemplary embodiment of the present invention, which can be performed in response to a user's operation to select the connection permission button display screen input via the operation unit 201. To realize the processing in each step illustrated in the flowchart illustrated in FIG. 12, the CPU of the image forming apparatus 101 executes a computer program.

In step S1401, the operation detection unit 405 detects a user's operation to select the connection permission button display screen via the operation unit 201. If the user's operation is detected by the operation detection unit 405 (YES in step S1401), the processing proceeds to step S1402.

In step S1402, the button display determination unit 406 of the image forming apparatus 101 acquires the error history information 601 from the storage device 206. In step S1403, the button display determination unit 406 confirms whether there is any unprocessed error in the error history information 601 acquired in step S1402, referring to the error recovery date and time 603. If it is determined that there is an unprocessed error (YES in step S1403), the processing proceeds to step S1404. If it is determined that there is not any unprocessed error (NO in step S1403), the processing proceeds to step S1407.

In step S1404, the image forming apparatus 101 acquires the inquiry destination information 701 with respect to status information of the management apparatus 105 from the storage device 206. The button display determination unit 406 inquires the management apparatus 105 about status information via the network I/F 202 based on the acquired inquiry destination.

If the image forming apparatus 101 receives the status information 1301 from the management apparatus 105 as a response of the inquiry, the image forming apparatus 101 temporarily stores the received status information 1301 in the RAM 205. In step S1405, the button display determination unit 406 determines whether the standby flag 1302 is "ON" referring to the status information 1301 stored in the RAM 205 in step S1404. If it is determined that the standby flag 1302 is "ON" (YES in step S1405), the processing proceeds to step S1406. If it is determined that the standby flag 1302 is "OFF" (NO in step S1405), the processing proceeds to step S1407.

In step S1406, the display screen generation unit 409 causes the operation unit 201 to display the connection permission button in a valid state where the user can press the connection permission button. Namely, the display screen generation unit 409 enables the connection permission button. Subsequently, the image forming apparatus 101 waits for a user's operation to press the connection permission button.

In step S1407, the display screen generation unit 409 disables the connection permission button displayed on the operation unit 201 to prevent the user from operating the connection permission button. Namely, the display screen generation unit 409 does not display or grays out the connection permission button. Then, the image forming apparatus 101 terminates the processing illustrated in FIG. 12.

In step S1408, the operation detection unit 405 determines whether the user has pressed the connection permission button displayed on the operation unit 201. If the operation detection unit 405 detects the user's operation on the connection permission button (YES in step S1408), the processing proceeds to step S1409.

In step S1409, the image forming apparatus 101 generates connection start information 507 and stores the generated connection start information in the RAM 205. Then, the communication unit 404 transmits the connection start information 507 to the management apparatus 105 via the network I/F 202.

When the processing in step S1409 is completed (i.e., when the transmission of the connection start information 507 from the communication unit 404 to the management apparatus 105 is completed), the image forming apparatus 101 can receive a remote operation command from the management apparatus 105. In the present exemplary embodiment, if the management apparatus 105 receives the connection start information 507, the management apparatus 105 can start a remote operation of the image forming apparatus 101.

A standby service engineer, if operating a PC that can use the functions of the management apparatus 105, can also start a remote operation of the image forming apparatus 101. The remote operation of the image forming apparatus 101 includes acquiring and browsing various setting values of the image forming apparatus 101 and measurement values of environmental information, and changing the settings (e.g., parameters relating to image formation) of the image forming apparatus 101.

If the image forming apparatus 101 receives the setting change information 1304 having been set by a service engineer at a setup place of the management apparatus 105, the image forming apparatus 101 updates the settings so as to reflect the received setting change information 1304. The present exemplary embodiment is not limited to the above-described setting changes and can be applied to any other maintenance operation executable based on a remote command.

FIG. 13 is a flowchart illustrating an example operation of the management apparatus 105, which can be performed in response to a status information inquiry received from the image forming apparatus 101. To realize the processing in each step of the flowchart illustrated in FIG. 13, the CPU of the management apparatus 105 executes a computer program.

In step S1501, the communication I/F unit 1004 of the management apparatus 105 receives a status information inquiry from the image forming apparatus 101. In this case, the status information inquiry received from the image forming apparatus 101 includes an image forming apparatus ID as indicated in the inquiry destination information 701. Therefore, the management apparatus 105 acquires the image forming apparatus ID and temporarily stores the acquired image forming apparatus ID in the RAM 804.

In step S1502, the image forming apparatus data acquisition unit 1007 acquires the image forming apparatus status information list from the storage device 808 via the status information input/output unit 1011. The image forming apparatus data acquisition unit 1007 acquires the standby flag 1203 and the standby flag setting date and time 1204 referring to status information corresponding to the image forming apparatus ID stored in the RAM 804 in step S1501. The standby flag 1203 and the standby flag setting date and time 1204 are stored in the RAM 804.

In step S1503, the image forming apparatus data acquisition unit 1007 generates the status information 1301 relating to the image forming apparatus 101 stored in the RAM 804 in step S1502 and temporarily stores the generated status information 1301 in the RAM 804. Subsequently, the communication I/F unit 1004 transmits the status information 1301 stored in the RAM 804 to the image forming apparatus 101 via the network.

In the present exemplary embodiment, the image forming apparatus 101 and the management apparatus 105 provide characteristic screens (see FIGS. 14A to 15C). The image forming apparatus 101 provides a selection screen that enables an operator to select the connection permission button display screen and the connection permission button display screen. The management apparatus 105 provides an error history display screen, an error details screen, and a remote operation screen dedicated to the image forming apparatus 101.

The error details screen provided by the management apparatus 105 displays not only detailed error information but also a list of setting values and measurement values having been received from the image forming apparatus 101 in response to occurrence of the error, to enable users to prepare for the remote operation while browsing various detailed information relating to the image forming apparatus 101. Further, the error details screen enables users to set a standby flag indicating accomplishment of the preparation for the remote operation.

The remote operation screen is a screen usable by users to perform a remote operation of the image forming apparatus 101 after the connection start information 506 is received from the image forming apparatus 101.

Figure 14A:
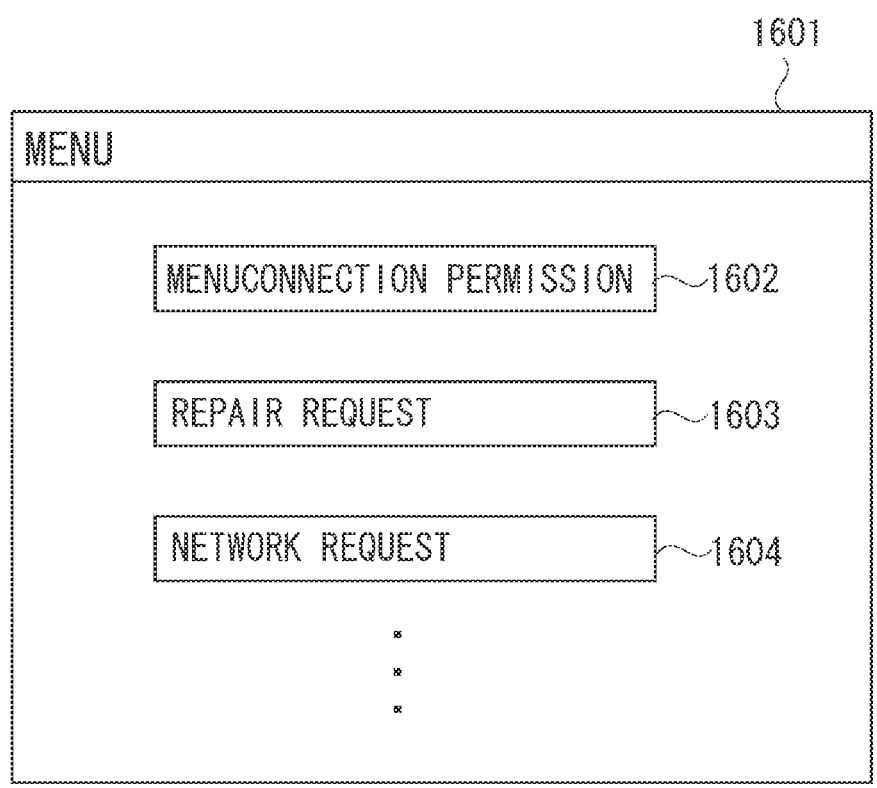

FIG. 14A illustrates an example of a menu screen that can be displayed on the operation unit 201 of the image forming apparatus 101.

A menu screen 1601 illustrated in FIG. 14A includes a button 1602 operable to open the connection permission button display screen, a button 1603 operable to open a repair request notification screen, and a button 1604 operable to open a network setting screen.

In the present exemplary embodiment, if the image forming apparatus 101 detects a user's operation to press the button 1602 to open the connection permission button display screen, the button display determination unit 406 starts determining whether to display the connection permission button as described with reference to the flowchart illustrated in FIG. 12. The image forming apparatus 101 provides the connection permission button display screen to be displayed on the operation unit 201 according to a result of the above-described determination.

FIG. 14B illustrates an example of the connection permission button display screen, which can be displayed on the operation unit 201 of the image forming apparatus 101 when the button display determination unit 406 determines to display the connection permission button.

A connection permission button display screen 1605 illustrated in FIG. 14B includes a connection permission button 1606. In the state of the connection permission button 1606 illustrated in FIG. 14B, the connection permission button 1606 is operable by users. If the image forming apparatus 101 detects a user's operation to press the connection permission button 1606, the image forming apparatus 101 transmits the connection start information 507 to the management apparatus 105.

FIG. 14C illustrates an example of the connection permission button display screen, which can be displayed on the operation unit 201 of the image forming apparatus 101 in a case where the button display determination unit 406 determines to disable the connection permission button.

The connection permission button display screen 1605 includes a connection permission button 1607. In the state of the connection permission button 1607, the connection permission button 1607 is disabled and the image forming apparatus 101 does not perform any processing even if the connection permission button 1607 is pressed by a user.

Figure 15A:
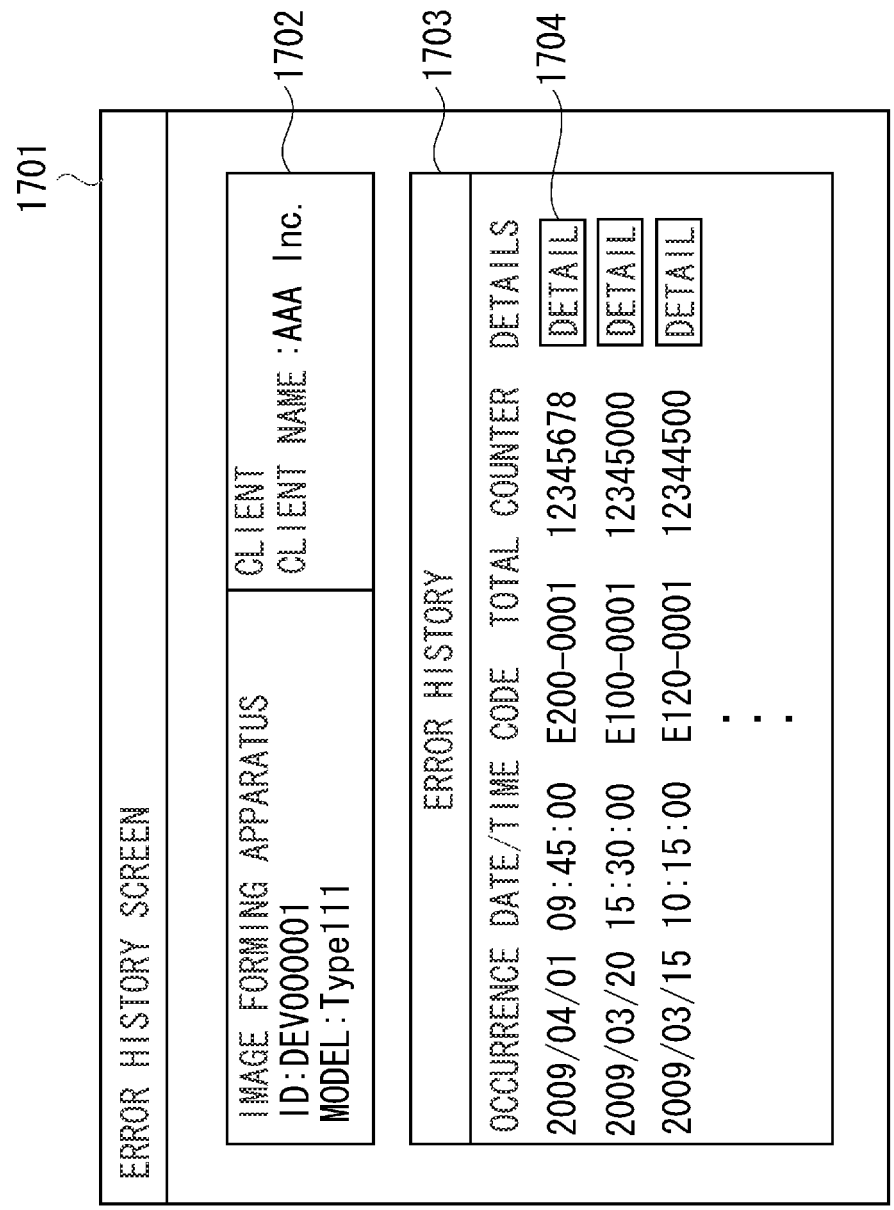

FIG. 15A illustrates an example of an error history screen relating to the image forming apparatus 101, which can be displayed on the display device 809 of the management apparatus 105.

FIG. 15A illustrates an error history screen 1701 dedicated to the image forming apparatus 101. The error history screen 1701 includes various types of information 1702 relating to the image forming apparatus 101. For example, the information 1702 includes image forming apparatus ID, model name, and information indicating an owner of the image forming apparatus 101. The error history screen 1701 further includes error history information 1703 of the image forming apparatus 101.

The error history information 1703 includes error occurrence date and time, error code, and total counter (at the error occurrence timing). An error details button 1704 is operable to display detailed information of each error. If the error details button 1704 is pressed, a screen displaying details of the corresponding error can be opened.

Figure 15B:
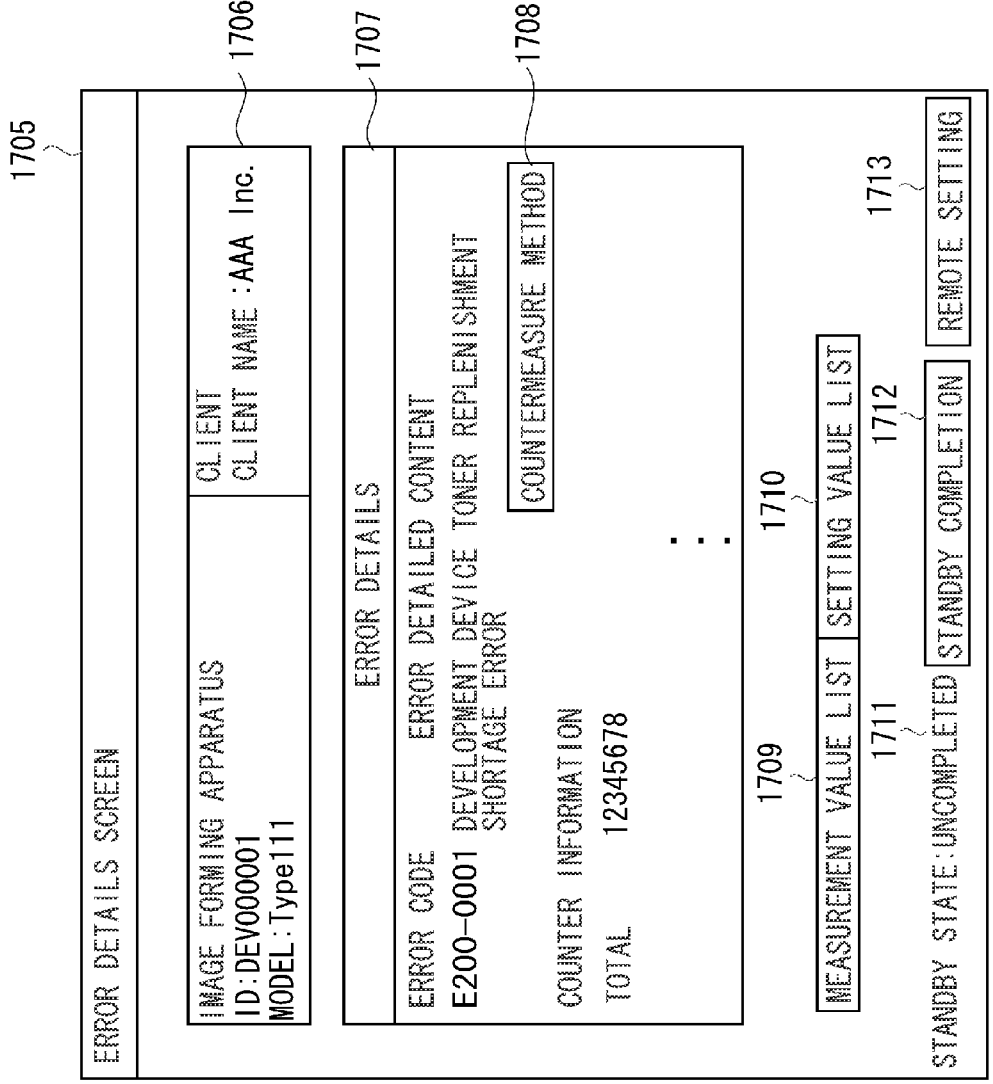

FIG. 15B illustrates an example of the error details screen relating to the image forming apparatus 101 according to the present exemplary embodiment, which can be displayed on the display device 809 of the management apparatus 105.

An error details screen 1705 illustrated in FIG. 15B includes various type of information 1706 relating to the image forming apparatus 101, which is similar to the information 1702 illustrated in FIG. 15A. The error details screen 1705 includes an error details field 1707 in which details of an error selected by a user from the error history information 1703 is displayed. The error information displayed in the error details field 1707 includes an error code, an error detailed content, a countermeasure method button 1708 operable to display an error countermeasure method, and counter information.

The error details screen 1705 further includes a button 1709 operable to open a measurement value list display screen and a button 1710 operable to open a setting value list display screen, which are received beforehand from the image forming apparatus 101 and stored in the storage device 808.

The error details screen 1705 further includes standby state information field 1711 indicating whether the standby flag is ON. The management apparatus 105 refers to the status information list 1201 stored in the storage device 808. If the standby flag is OFF, a text "uncompleted" is displayed in the standby state information field 1711. If the standby flag is ON, a text "completed" is displayed in the standby state information field 1711.

In a case where the standby flag is OFF, a user can press a standby completion button 1712 to set the standby flag to ON. A remote operation screen display button 1713 is operable to open a screen required to perform a remote operation of the image forming apparatus 101.

FIG. 15C illustrates an example of the remote operation screen of the image forming apparatus 101 according to the present exemplary embodiment, which can be displayed on the display device 809 of the management apparatus 105.

A remote operation screen 1714 illustrated in FIG. 15C includes various types of information 1715 relating to the image forming apparatus 101, which is similar to the information 1702 illustrated in FIG. 15A. The remote operation screen 1714 further includes a setting item list 1716. The setting item list 1716 displays item names and present values as well as an updated value input field 1718.

The value displayed as a present value is a setting value received beforehand from the image forming apparatus 101 and stored in the storage device 808. Users can operate the input devices 810 and 811 to input a value to be changed in the updated value input field 1718. A setting change transmission button 1717 is operable to transmit the setting change information 1304 to the image forming apparatus 101 when the setting change information 1304 is generated based on an updated value in the change value input field 1718. The transmission of the setting change information 1304 can be performed in response to a notification of connection permission received from the image forming apparatus 101.

As described above, the present exemplary embodiment can provide the connection permission button that can be operated by users if the preparation for the remote operation by the management apparatus 105 is accomplished in a case where an error has occurred in the image forming apparatus 101. Therefore, the present exemplary embodiment can reduce the amount of communications unnecessarily performed with the management apparatus 105 and can reduce the occurrence of a phenomenon that may cause a security problem.

Further, as described above, it is determined whether any unprocessed error is present in the error history of the image forming apparatus 101, as one of the conditions for displaying the connection permission button. However, the connection permission button display conditions are not limited to the above-described ones.

For example, according to an exemplary embodiment of the present invention, a user can spontaneously send a repair request notification to the management apparatus 105 if the user detects any disorder of a device (e.g., unsatisfactory tint) that cannot be detected by the image forming apparatus. If any unprocessed item is present in the history of the repair request notification, similar processing can be performed.

In general, an image forming apparatus is capable of immediately recovering from interruption by each occurrence of jam. However, if the occurrence of jam is so frequent, users may not be able to satisfactorily use the image forming apparatus. In such a case, it is useful to change settings relating to jam detection as a temporary countermeasure for reducing the occurrence of jam. The temporary countermeasure is useful to temporarily prevent the image forming apparatus from being shut down for a long time until completion of fundamental countermeasure. In this manner, it is useful to determine to display the connection permission button if the remote operation is necessary even in a case where the phenomenon of jam does not continuously occur.

Hereinafter, operations of the image forming apparatus 101 and the management apparatus 105 according to a second exemplary embodiment of the present invention are described below, which can be performed in response to a detection of a user's operation input via the operation unit 201. The description of the second exemplary embodiment is limited to a portion different from the portion described in the first exemplary embodiment.

FIG. 16 illustrates an example of an error code list according to the second exemplary embodiment, which is stored in the storage device 206 of the image forming apparatus 101 as a determination target according to the present exemplary embodiment.

A determination target error code list 1801 illustrated in FIG. 16 includes error codes and details of respective error codes (see 1802). The error codes illustrated in FIG. 16 are targets to be determined by the management apparatus 105 with respect to the necessary of remote operation.

In the present exemplary embodiment, the management program 904 running on the management apparatus 105 detects the occurrence of frequent jams and the presence of any error being left based on the image forming apparatus status information. The example illustrated in FIG. 16 includes error codes relating to jams to enable the management apparatus 105 to detect the occurrence of frequent jams referring to the error history of the image forming apparatus 101 and determines the necessity of the remote operation.

Further, in the present exemplary embodiment, error code values of respective management apparatus determination targets are individually designated. Alternatively, it is useful to designate a value range for each code.

In the present exemplary embodiment, the error history information 601 described in the first exemplary embodiment is referred to similarly and only a part different from that of the first exemplary embodiment is described below. In the second exemplary embodiment, the latest error is an error code "E100-0001 (drum winding jam)" having occurred at "2009/03/20 15:30" and recovered at "2009/03/20 15:31." In this case, the image forming apparatus 101 determines that there is not any unprocessed error.

In the management apparatus 105, the image forming apparatus data acquisition unit 1007 refers to the error history information 1101 of the image forming apparatus 101 stored in the storage device 808 and determines whether to perform the remote operation. In the present exemplary embodiment, the management apparatus 105 determines whether the occurrence of jams is frequent as a state requiring the remote operation.

The frequency determination with respect to the occurrence of jams can be performed by checking whether the occurrence of the same jam, among the error history information 1101 received from the image forming apparatus 101, is equal to or greater than a predetermined value during an output of a predetermined number of sheets.

In the present exemplary embodiment, the management apparatus 105 determines that the occurrence of jams is frequent if the occurrence of the same jam is equal to or greater than three times during the output of 1000 sheets. According to the error history information illustrated in FIG. 9, the drum winding jam (E100-0001) has first occurred at the total counter value "12344090" and the same error has occurred four times until the total counter becomes equal to "12345000."

Therefore, the management apparatus 105 determines that the image forming apparatus 101 is in a jam frequent occurrence state. The determined jam frequent occurrence state can be displayed on the error details screen 1705 to notify the occurrence of frequent jams to an operator of the management apparatus 105.

If an operator or a service engineer knows frequent occurrence of the drum winding jam in the image forming apparatus 101, the operator or the service engineer presses the standby completion button 1712 to set the standby flag to ON for the required remote operation. Further, the operator or the service engineer can set a "writing start position adjustment value" on the remote operation screen 1714 as a temporary countermeasure for reducing the frequent occurrence of the drum winding jam. Therefore, the present exemplary embodiment can suppress the occurrence of the drum winding jam and temporarily prevent the image forming apparatus 101 from being shut down for a long time until a drum exchange operation is completed.

In this case, as another method for detecting the frequent occurrence of jams, it is useful to determine whether the frequency of jams occurring in a predetermined time exceeds a threshold value instead of referring to the total counter.

Figure 17:
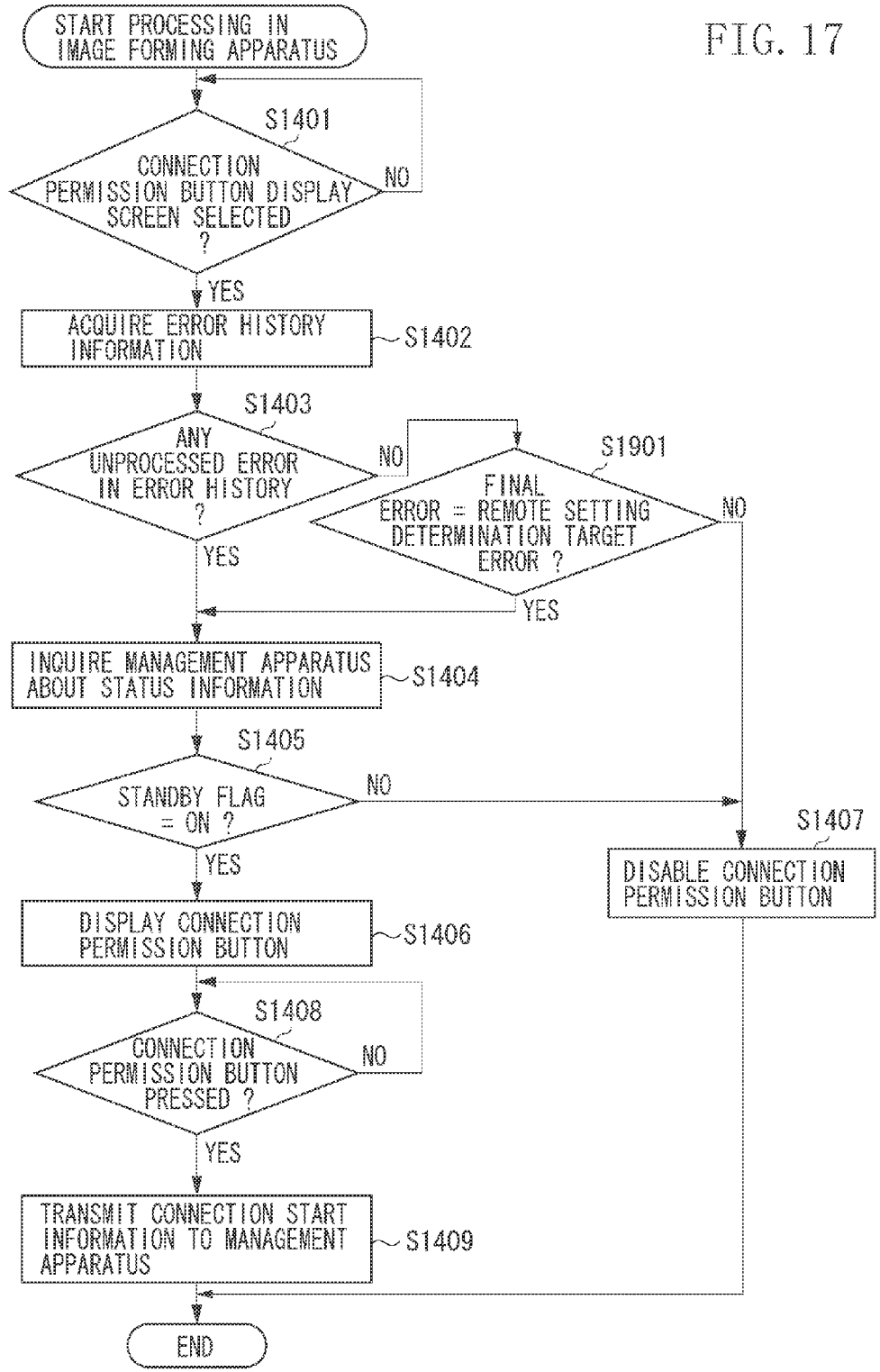
FIG. 17 is a flowchart illustrating an operation of the image forming apparatus according to the second exemplary embodiment image forming apparatus.

FIG. 17 is a flowchart illustrating an example operation of the image forming apparatus 101 according to the second exemplary embodiment, which can be performed in response to a user's operation to select the connection permission button display screen input via the operation unit 201. Hereinafter, processing described below is only a part different from the operation (FIG. 12) of the image forming apparatus 101 according to the first exemplary embodiment.

If the image forming apparatus 101 determines that there is not any unprocessed error (NO in step S1403), the processing proceeds to step S1901. In the second exemplary embodiment, as described above, it is assumed that the latest error is the error code "E100-0001" having occurred at "2009/03/20 15:30" and recovered at "2009/03/20 15:31." Therefore, in the present exemplary embodiment, it is determined that there is not any unprocessed error. The processing proceeds to step S1901.

In step S1901, the button display determination unit 406 acquires the error history information 601 and the determination target error code list 1801 from the storage device 206. The button display determination unit 406 refers to a finally occurred error code in the acquired error history information 601 and determines whether the finally occurred error code is included in the acquired error code list 1801.

If it is determined that the finally occurred error code is included in the error code list 1801 (YES in step S1901), the processing proceeds to step S1404. If it is determined that the finally occurred error code is not included in the error code list 1801 (NO in step S1901), the processing proceeds to step S1407. In the present exemplary embodiment, the finally occurred error code "E100-0001" is included in the error code list 1801. Therefore, the processing proceeds to step S1404.

In the present exemplary embodiment, as described above, the button display determination unit 406 determines whether the finally occurred error code is included in the acquired error code list 1801. However, it is also useful to determine whether an error code having occurred during a predetermined period is included in the error code list 1801.

According to the present exemplary embodiment, the connection permission button can be displayed to permit users to start a remote operation with respect to a special phenomenon (e.g., failure frequently occurring or being left) detected by the management apparatus 105, even when it is determined that the remote operation is necessary.

In a case where a remote operation for the image forming apparatus 101 is performed to solve a problem (error) having occurred, the phenomenon may not be improved by the remote operation. For example, in a case where a detected error is the development device toner replenishment shortage error, the occurrence of errors can be temporarily prevented by remote operating an error occurrence reference value. However, the error occurrence reference value requires an adjustment differentiated for each image forming apparatus.

Further, the same error may occur again even when the occurrence of errors can be temporarily suppressed immediately after a changing operation. In such a case, even if the same error having subsequently occurred is immediately solved, it is necessary to change the setting to permit users to use the image forming apparatus until the fundamental countermeasure is completed.

According to a third exemplary embodiment of the present invention, the image forming apparatus displays the connection permission button regarding a specific phenomenon for a predetermined period from the previous setting change, even when the occurrence of a phenomenon is not continuous, based on an assumption that a remote operation is required.

Example operations of the image forming apparatus 101 and the management apparatus 105, which can be performed in response to a detection of a user's operation input via the operation unit 201, are described below. In the present exemplary embodiment, only a part different from that of the first exemplary embodiment is described below.

FIG. 18 illustrates an example of error codes that require a predetermined period of monitoring according to the present exemplary embodiment, which is stored in the storage device 206 of the image forming apparatus 101. A monitoring target error code list 2001 illustrated in FIG. 18 includes a monitoring term 2002 and a monitoring target error code 2003 (including details of error code, monitoring state, and monitoring start date and time).

Each error illustrated in FIG. 18 requires a monitoring term of "five days." Further, referring to the monitoring target error code 2003, it is understood that the monitoring of the error code "E200-0001" is currently in progress. Until the above-described error monitoring term ends, the image forming apparatus 101 continuously displays the connection permission button even when the occurrence of an error is not currently detected.

The monitoring start date and time represents the reception timing of the setting change information 1304 transmitted from the management apparatus 105 and received by the image forming apparatus 101.

The above-described monitoring term is a predetermined period or can be set according to each error code, or can be set as a period that starts at completion of a maintenance work by a service engineer and ends upon completion of the fundamental countermeasure.

FIG. 19 is a flowchart illustrating an operation of the image forming apparatus 101 according to the third exemplary embodiment, which can be performed in response to a user's operation to select the connection permission button display screen input via the operation unit 201.

Hereinafter, processing described below is only a part different from the operation (FIG. 12) of the image forming apparatus 101 according to the first exemplary embodiment.

If the image forming apparatus 101 determines that there is not any unprocessed error (NO in step S1403), the processing proceeds to step S2101. In the third exemplary embodiment, it is assumed that the latest error is the error code "E100-0001" having occurred at "2009/03/20 15:30" and recovered at "2009/03/20 15:31." Therefore, in the present exemplary embodiment, it is determined that there is not any unprocessed error. The processing proceeds to step S2101.

In step S2101, the button display determination unit 406 acquires error code monitoring information 2001 from the storage device 206. The button display determination unit 406 determines whether the error is an error being currently monitored referring to the acquired error code monitoring information 2001. If there is an error being currently monitored (YES in step S2101), the processing proceeds to step S1404. If there is not any error being currently monitored (NO in step S2101), the processing proceeds to step S1407.

According to the error code monitoring information illustrated in FIG. 18, it is understood that the monitoring of the error code "E200-0001" is currently in progress. Therefore, the processing proceeds to step S1404.

The processing according to the present exemplary embodiment includes determining that the remote operation is required for a predetermined period after completion of the previous remote operation, even when there is not any unprocessed error. Therefore, the connection permission button can be displayed in a case where re-execution, correction, and fine adjustment for the previous remote operation are required.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-245811 filed Oct. 26, 2009, which is hereby incorporated by reference herein in its entirety.

What is claimed is:

1. A management system including a plurality of image forming apparatuses and a management apparatus that can communicate with each other via a network,
the management apparatus comprising:
a storage unit configured to store status information of the management apparatus, the status information indicating whether the management apparatus is ready for a remote operation of each image forming apparatus and being set to the management apparatus by an operator; and
a response unit configured to transmit the status information stored in the storage unit to the image forming apparatus in response to an inquiry received from the image forming apparatus,
each of the plurality of image forming apparatuses comprising:
a management unit configured to manage a phenomenon having occurred in the image forming apparatus as history information;
an inquiry unit configured to inquire the management apparatus about the status information;
a reception unit configured to receive the status information corresponding to the image forming apparatus, from the management apparatus, as a response to an inquiry from the inquiry unit; and
a control unit configured to enable a function for starting communication to the management apparatus for the remote operation by the management apparatus, wherein the enabled function is used to acquire user's permission of the user of the image forming apparatus for the communication for the remote operation,
wherein the control unit enables the function for starting the communication to the management apparatus so as to acquire the user's permission for the communication for the remote operation if the history information managed by the management unit includes an unprocessed phenomenon and the status information transmitted from the management apparatus to the reception unit indicates that the management apparatus is ready for the remote operation.

2. The management system according to claim 1, wherein the each of the plurality of image forming apparatuses further comprising, a connection start unit configured to cause the image forming apparatus to start the communication to the management apparatus in response to a user's operation to execute the function for starting the communication to the management apparatus enabled by the control unit, and
wherein the remote operation by the management apparatus can be realized by causing the image forming apparatus to execute a command transmitted from the management apparatus in the communication started and established by the connection start unit.

3. The management system according to claim 1, wherein the management apparatus further comprises a provision unit configured to provide a screen that can be used to confirm a measurement value and a setting value acquired from the image forming apparatus,
wherein the measurement value includes a value relating to at least one of internal apparatus temperature, humidity, drum surface temperature, and drum surface potential, and the setting value includes a value relating to at least one of tint adjustment, density adjustment, writing start position, and toner replenishment amount.

4. The management system according to claim 3, wherein when the image forming apparatus transmits the measurement value to the management apparatus, a phenomenon having occurred in the image forming apparatus is notified and transmitted to the management apparatus, and when the image forming apparatus transmits the setting value to the management apparatus, transmission is performed in response to a change of the setting value of the image forming apparatus via an operation unit, and
wherein the management apparatus manages the measurement value and the setting value transmitted from the image forming apparatus.

5. The management system according to claim 1, wherein the control unit enables the function for starting the communication to the management apparatus if the history information managed by the management unit includes a phenomenon for which the management apparatus determines whether to perform the remote operation and the status information transmitted from the management apparatus to the reception unit indicates that the management apparatus is ready for the remote operation.

6. The management system according to claim 5, wherein the phenomenon for which the management apparatus determines whether to perform the remote operation is a jam that induces frequent occurrence of jams.

7. The management system according to claim 1, wherein the control unit enables the function for starting the communication to the management apparatus if the history information managed by the management unit includes a phenomenon that requires monitoring even after the remote operation by the management apparatus is completed and the status information transmitted from the management apparatus to the reception unit indicates that the management apparatus is ready for the remote operation.

8. The management system according to claim 2, wherein the management apparatus transmits a command for changing a setting value of the image forming apparatus to the image forming apparatus, to realize the remote operation by the management apparatus, in the communication started and established by the connection start unit.

9. The management system according to claim 1, wherein the function for starting the communication to the management apparatus is not enabled if the status information transmitted from the management apparatus to the reception unit indicates that the management apparatus is not ready for the remote operation.

10. An image forming apparatus that can communicate with a management apparatus via a network, the image forming apparatus comprising:
  a management unit configured to manage a phenomenon having occurred in the image forming apparatus as history information;
  an inquiry unit configured to inquire the management apparatus about status information of the management apparatus, the status information indicating whether the management apparatus is ready for a remote operation of the image forming apparatus and being set to the management apparatus by an operator;
  a reception unit configured to receive the status information corresponding to the image forming apparatus, from the management apparatus, as a response to an inquiry from the inquiry unit;
  a control unit configured to enable a function for starting communication to the management apparatus, wherein the enabled function is used to acquire user's permission of the user of the image forming apparatus for the communication for the remote operation; and
  a connection start unit configured to cause the image forming apparatus to start the communication to the management apparatus in response to a user's operation to execute the function for starting the communication to the management apparatus enabled by the control unit,
  wherein the control unit enables the function for starting the communication to the management apparatus so as to acquire the user's permission for the communication for the remote operation if the history information managed by the management unit includes an unprocessed phenomenon and the status information transmitted from the management apparatus to the reception unit indicates that the management apparatus is ready for the remote operation, and
  wherein the remote operation by the management apparatus can be realized by causing the image forming apparatus to execute a command transmitted from the management apparatus in the communication started and established by the connection start unit.

11. The image forming apparatus according to claim 10, wherein the control unit enables the function for starting the communication to the management apparatus if the history information managed by the management unit includes a phenomenon for which the management apparatus is required to determine whether to perform the remote operation and the status information transmitted from the management apparatus to the reception unit indicates that the management apparatus is ready for the remote operation.

12. The image forming apparatus according to claim 11, wherein the phenomenon for which the management apparatus is required to determine whether to perform the remote operation is a jam that induces frequent occurrence of jams.

13. The image forming apparatus according to claim 10, wherein the control unit enables the function for starting the communication to the management apparatus if the history information managed by the management unit includes a phenomenon that requires monitoring even after the remote operation by the management apparatus is completed and the status information transmitted from the management apparatus to the reception unit indicates that the management apparatus is ready for the remote operation.

14. A method for controlling an image forming apparatus that communicates with a management apparatus via a network, the method comprising:
  managing a phenomenon having occurred in the image forming apparatus as history information;
  inquiring the management apparatus about status information of the management apparatus, the status information indicating whether the management apparatus is ready for a remote operation of the image forming apparatus and being set to the management apparatus by an operator;
  receiving the status information corresponding to the image forming apparatus, from the management apparatus, as a response to an inquiry;
  enabling a function for starting communication to the management apparatus, wherein the enabled function is used to acquire user's permission of the user of the image forming apparatus for the communication for the remote operation;
  causing the image forming apparatus to start the communication to the management apparatus in response to a user's operation to execute the enabled function for starting the communication to the management apparatus; and
  enabling the function for starting the communication to the management apparatus so as to acquire the user's permission for the communication for the remote operation if the managed history information includes an unprocessed phenomenon and the status information transmitted from the management apparatus indicates that the management apparatus is ready for the remote operation.

15. A non-transitory computer-readable storage medium storing a computer program for causing a computer to execute a method for an image forming apparatus which communicates with a management apparatus via a network, the method comprising:
  managing a phenomenon having occurred in the image forming apparatus as history information;
  inquiring the management apparatus about status information of the management apparatus, the status information indicating whether the management apparatus is ready for a remote operation of the image forming apparatus and being set to the management apparatus by an operator;

receiving the status information corresponding to the image forming apparatus, from the management apparatus, as a response to an inquiry;

enabling a function for starting communication to the management apparatus, wherein the enabled function is used to acquire user's permission of the user of the image forming apparatus for the communication for the remote operation;

causing the image forming apparatus to start the communication to the management apparatus in response to a user's operation to execute the enabled function for starting the communication to the management apparatus; and enabling the function for starting the communication to the management apparatus so as to acquire the user's permission for the communication for the remote operation if the managed history information includes an unprocessed phenomenon and the status information transmitted from the management apparatus indicates that the management apparatus is ready for the remote operation.

* * * * *